United States Patent [19]

Krogmann et al.

[11] Patent Number: 4,914,598
[45] Date of Patent: Apr. 3, 1990

[54] INTEGRATED REDUNDANT REFERENCE SYSTEM FOR THE FLIGHT CONTROL AND FOR GENERATING HEADING AND ATTITUDE INFORMATIONS

[75] Inventors: Uwe Krogmann; Jurgen Bessel, both of Überlingen, Fed. Rep. of Germany

[73] Assignee: Bodenseewek Geratetechnik GmbH, Fed. Rep. of Germany

[21] Appl. No.: 106,380

[22] Filed: Oct. 6, 1987

[30] Foreign Application Priority Data

Oct. 7, 1986 [DE] Fed. Rep. of Germany ....... 3634023

[51] Int. Cl.⁴ .......................... G01C 19/00; G05D 1/10
[52] U.S. Cl. ..................................... 364/434; 364/453; 364/559; 364/566; 33/321; 244/177; 244/194; 73/504
[58] Field of Search ............... 364/453, 443, 566, 559; 73/504; 33/321-324; 244/177, 194, 76 R

[56] References Cited

U.S. PATENT DOCUMENTS

| | | | |
|---|---|---|---|
| 3,231,726 | 1/1966 | Williamson | 33/322 X |
| 3,403,874 | 10/1968 | Boskovich et al. | 33/321 X |
| 3,408,024 | 10/1968 | Iverson | 244/194 |
| 3,489,004 | 1/1970 | Barnhill et al. | 364/434 X |
| 3,492,465 | 1/1970 | Buscher et al. | 244/194 X |
| 3,496,836 | 2/1970 | Jenney | 244/194 X |
| 3,680,355 | 8/1972 | Goldstein et al. | 33/321 X |
| 4,179,818 | 12/1979 | Craig | 33/321 |
| 4,212,443 | 7/1980 | Duncan et al. | 33/321 X |
| 4,280,188 | 7/1981 | Weinstein et al. | 33/321 X |
| 4,327,437 | 4/1982 | Gelderloos | 244/194 X |

Primary Examiner—Eugene R. Laroche
Assistant Examiner—Benny Lee
Attorney, Agent, or Firm—Lee, Mann, Smith, McWilliams & Sweeney

[57] ABSTRACT

A plurality of two-axis rate gyros are arranged in relation to an aircraft-fixed coordinate system such that they redundantly supply angular rate information. A plurality of accelerometers supply correspondingly redundant acceleration information. First signal processing means comprise means for failure detection and elimination, such that angular rate and acceleration information subjected to error are eliminated. The angular rate and acceleration information thus cleared from errors supply stabilization signals for the autopilot. Second signal processing means obtain the angular rate and acceleration information cleared from errors and integrated if required, and therefrom supply heading and attitude reference signals.

25 Claims, 21 Drawing Sheets

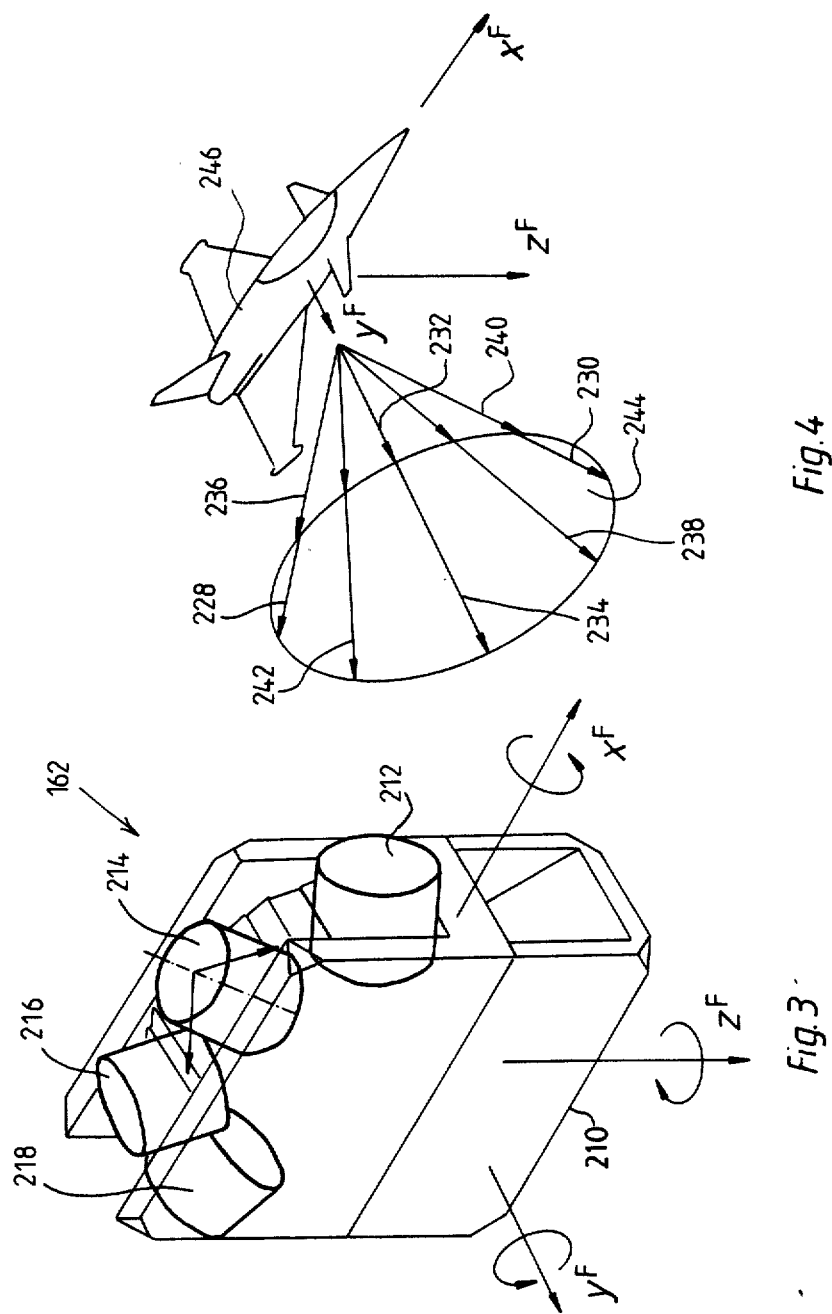

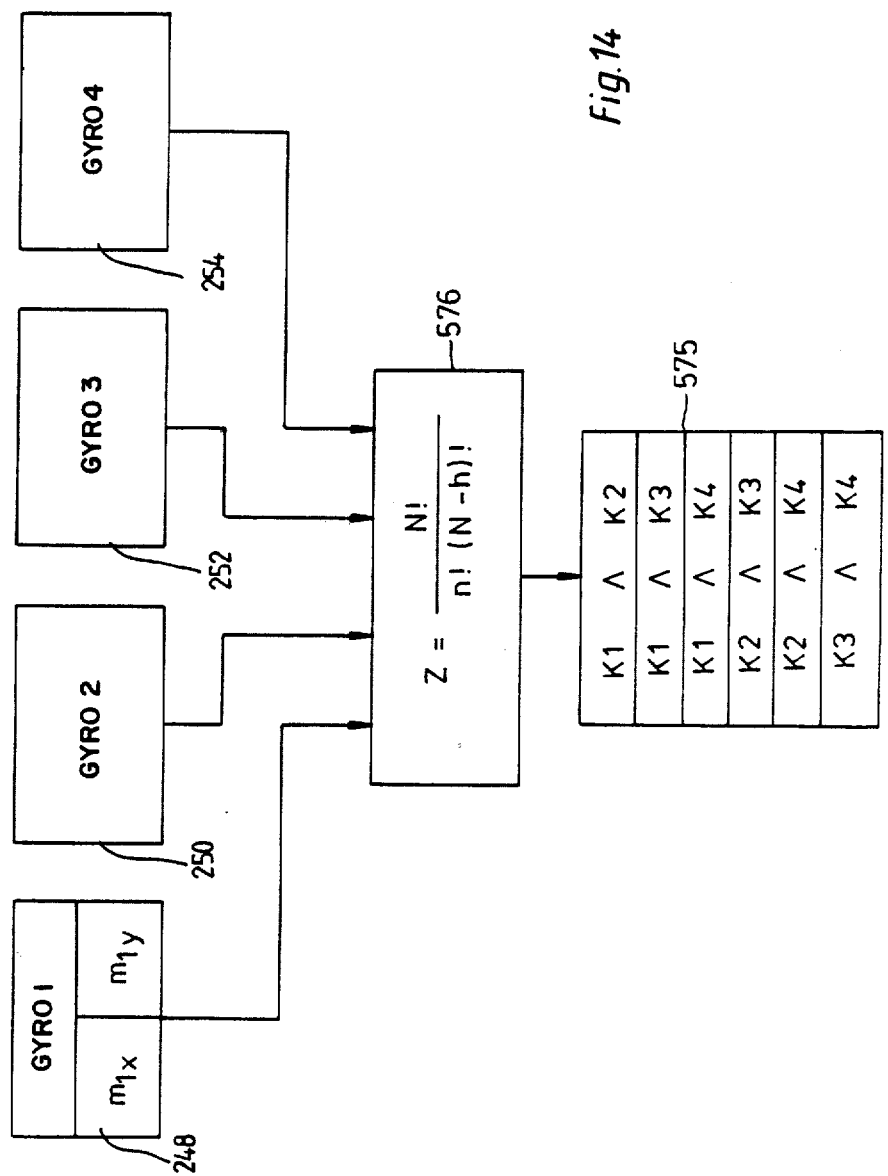

MAJORITY CONSIDERATION (VOTING) OVER REDUNDANT PITCH VELOCITY

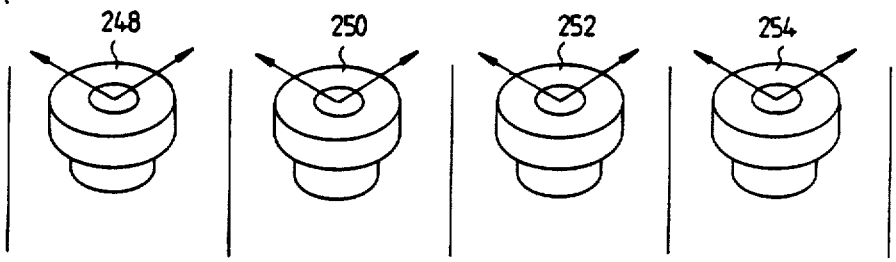

$$q = K_1(G1x + G1y) = K_1(G2x + G2y) = K_1(G3x + G3y) = K_1(G4x + G4y)$$

VALIDITY OF ROLLING AND YAWING VELOCITY INFORMATION DATA

PITCH VELOCITY DROP-OUT | VALID SOURCES OF THE ROLLING VELOCITY

| | $K_1(G2x - G2y)$ | $(G3x - G3y) - K_1(G1x - G1y)$ | $(G4x - G4y) + K_1(G1x - G1y)$ | $K_2(G3x - G3y) + K_2(G4x - G4y)$ |
|---|---|---|---|---|
| G1 | 1 | 0 | 0 | 1 |
| G2 | 0 | 1 | 1 | 1 |
| G3 | 1 | 0 | 1 | 0 |
| G4 | 1 | 1 | 0 | 0 |

VALID SOURCES OF THE YAWING VELOCITY

| | $(G4x - G4y) - K_1(G2x - G2y)$ | $K_2(G4x - G4y) - K_2(G3x - G3y)$ | $K_1(G1x - G1y)$ | $(G3x - G3y) + K_1(G2x - G2y)$ |
|---|---|---|---|---|
| G1 | 1 | 1 | 0 | 1 |
| G2 | 0 | 1 | 1 | 0 |
| G3 | 1 | 0 | 1 | 0 |
| G4 | 0 | 0 | 1 | 1 |

*Fig. 15*

INTEGRATED REDUNDANT REFERENCE SYSTEM FOR THE FLIGHT CONTROL AND FOR GENERATING HEADING AND ATTITUDE INFORMATIONS

TECHNICAL FIELD

The invention relates to an integrated redundant reference system for the flight control and for generating heading and attitude informations, comprising (a) at least four (strap down) angular rate sensors arranged in fixed relation to the carrier vehicle, the input axes of said angular rate sensors being orientated to each other such that they redundantly supply angular rate information, (b) a plurality of (strap down) acceleration sensors arranged in fixed relation to the carrier vehicle, which supply acceleration information, (c) means for failure detection, to which the angular rate signals are supplied, (d) first signal processing means,
   to which the angular rate and acceleration information are supplied, and
   which, for application to an autopilot, supply corrected angular rate and acceleration signals with reference to a vehicle-fixed coordinate system for the stabilization, and (e) second signal processing means,
   to which the corrected angular rate and acceleration information are supplied and
   which supply heading and attitude reference signals.

BACKGROUND ART

Autopilots comprise angular rate and acceleration sensors, for example rate gyros and accelerometers, which have the function to stabilize the flying movement against disturbances. In many aircrafts, particularly in combat aircrafts, with which a high maneuverability is important, the aerodynamic inherent stability of the aircraft is reduced to such an extent, that the stabilization of the aircraft by the autopilot actually is a necessary condition for the flyability of the aircraft. To prevent the aircraft from crashing in default of stabilization in case of failure of an element of the autopilot, the sensors, the circuits and the signal processing means necessary for the stabilization are provided multiply redundantly. This involves considerable expenditure.

The autopilot furthermore comprises a heading-attitude reference device. Such a heading-attitude reference device supplies the attitude angles of the aircraft in space, that is the pitch and roll angle, and the heading. For the heading-attitude reference device normally other sensors are used than for the stabilization. Also the sensors, the circuits and the signal processing means of the heading-attitude reference device are normally multiply provided in modern autopilots.

From U.S. Pat. No. 4,212,443 an integrated redundant reference system for the flight control and for generating heading and attitude information is known. The reference system comprises two two-axis rate gyros, that is dynamically tuned, electrically restrained gyros having two input axes perpendicular to each other and the spin axis. The spin axes of the two gyros are arranged crosswise to each other. The input axes of the two gyros are located in planes perpendicular to each other. When the direction of the input axes of the gyros are considered as vectors starting from a common origin, then the four input axes of the two two-axis rate gyros are located on a cone surface. The cone angle of the cone is 90°. The input axes of one of the rate gyros are located in a first plane diametrically opposite each other. The input axes of the other rate gyro are located in a second plane diametrically opposite each other. The axis of the cone is parallel to the roll direction. With this arrangement the angular rate of the aircraft about the roll axis is determined twice, namely from the sum of the signals of the input axes of one of the rate gyros and and from the sum of the signals of the input axes of the other rate gyro. When these two measuring values differ from each other by more than a predetermined threshold value representing the tolerances, this will be an indication that the reference device is defective.

In U.S. Pat. No. 4,212,443 it is also proposed to provide a second identical reference device, which is orientated to the axes of the aircraft in the same way as the first one. When the first reference device is defective a change-over is effected to the second one.

The reference device in U.S. Pat. No. 4,212,443 also comprises three mutually orthogonal accelerometers. The signals of the four input axes of the rate gyro are processed as follows: From the signals of the accelerometers and the measured flight velocity initial values of the flight attitude are obtained. By coordinate transformation and integration the elements of the direction cosine matrix are provided. From these the Euler angles are determined, establishing the heading and attitude of the aircraft. The signals of the rate gyros, furthermore, supply the angular rates of the aircraft in an aircraft-fixed coordinate system.

The known reference device just provides self-control, that means it supplies a failure signal when it is defective. Thus the reference device has the failure behavior "fail-safe". When the reference device is doubled, such that, in case of failure of a reference device, it automatically can be changed-over to the other one and the failure can be signalized, it result —with four two-axis rate gyros—in a failure behavior "fail-operational, fail-safe". When a first failure occurs at the rate gyros the system is still operative. A subsequently occuring second failure is indicated. For this behavior, however, it is a requirement that a roll movement actually takes place. When a defect of a rate gyro takes place during the time, when the angular rate about the roll axis is zero, this failure will not be indicated. Then, during a movement about the pitch axis, the aircraft can be controlled by a defective rate gyro.

A failure monitoring of the accelerometers is not at all effected in the known reference device.

The German patent application No. 3,141,836 provides an inexpensive heading-attitude reference device, which can be used as redundant device for a main device. Therein three rate gyros with coordinate transformation circuit and integrators supply roll and pitch angles. These angles are aided by transverse and longitudinal accelerometers through low-pass filters. The heading angle is aided in a heading filter by the main device as long as the main device is operative.

U.S. Pat. No. 4,020,702 describes a redundant inertial sensing system having two strap down platforms. The sensitivity axes of the sensors are aligned with the surfaces of a dodecahedron.

German patent application No. 3,233,612 describes a device for determining the north direction. The azimuth angle to the north is determined from the components of the horizontal component of the angular rate of the earth by means of a two-axis gyro having a vertical spin axis. In order to suppress the influence of disturbance movements about the input axes, the gyro is located together with vertical sensors on a gimbal suspended platform. The vertical sensors are applied to torquers of the gyro. Pick-offs of the gyro control platform servomotors. In another embodiment these processes are simulated with a "virtual platform" in the computer.

DISCLOSURE OF INVENTION

It is the object of the invention to provide an integrated, redundant reference system for the flight control and for generating heading and attitude information with a degree of security as high as possible, while using a minimum number of sensors.

Particularly it is the object of the invention, to obtain, by using four two-axis angular rate sensors a failure behaviour of "fail-operational, fail-operational, fail-safe", meaning that the system will remain operative even after the failure of two angular rate sensors, that the system will become inoperative only after a third angular rate sensor fails, and that the system will indicate its inoperative status to the pilot.

Furthermore it is the object of the invention to achieve a heading-attitude, reference system such that also the acceleration sensors show such a failure behaviour.

According to the invention this object is achieved in that (f) the at least four two-axis angular rate sensors are arranged with different orientations, (g) the signals of all angular rate sensors are applied to the means for failure detection and elimination common for all angular rate sensors, which means select a set of selected angular rate signals from intact angular rate sensors, (h) the selected angular rate informations are applied to the first and second signal processing means.

In order to achieve security against failure or defect of acceleration sensors, in accordance with a further modification of the invention (i) the acceleration sensors with more than three input axes are orientated to each other such that they redundantly supply acceleration information, (j) the acceleration information of all acceleration sensors are applied to the means for failure detection, which select therefrom a set of acceleration information from intact acceleration sensors, and (k) the selected acceleration information are applied to the first and second signal processing means.

The sensors used for the stabilization of the aircraft are used at the same time for obtaining a heading-attitude reference at least for emergency operation or for the purpose of display. By skillful arrangement of the sensors and using a minimum number of sensors a sufficient redundancy of the signal generation is obtained as well for the stabilization as for the heading-attitude reference. A failure detection and elimination is effected when one of the multiple sensors fails.

Modifications of the invention are subject matter of the sub-claims.

Two embodiments of the invention will now be described in greater detail with reference to the accompanying drawings.

BRIEF DESCRIPTION OF THE DRAWINGS

FIG. 3 is a perspective illustration and shows a sensor block having four two-axis rate gyros and eight accelerometers in a second embodiment of a reference device.

FIG. 4 is a schematic illustration and illustrates the orientation of the input axes of the acceleration sensors relative to the aircraft in the second embodiment of a reference device.

FIG. 14 is a schematic illustration and illustrates the number of combinations of two two-axis angular rate sensors (rate gyros) each, through which the total angular rate informations can be obtained.

FIG. 15 is an illustration of the four two-axis gyros with a table for explanation of the majority monitoring, when localizing a defective rate gyro.

BEST MODES OF CARRYING OUT THE INVENTION

Figure 1:
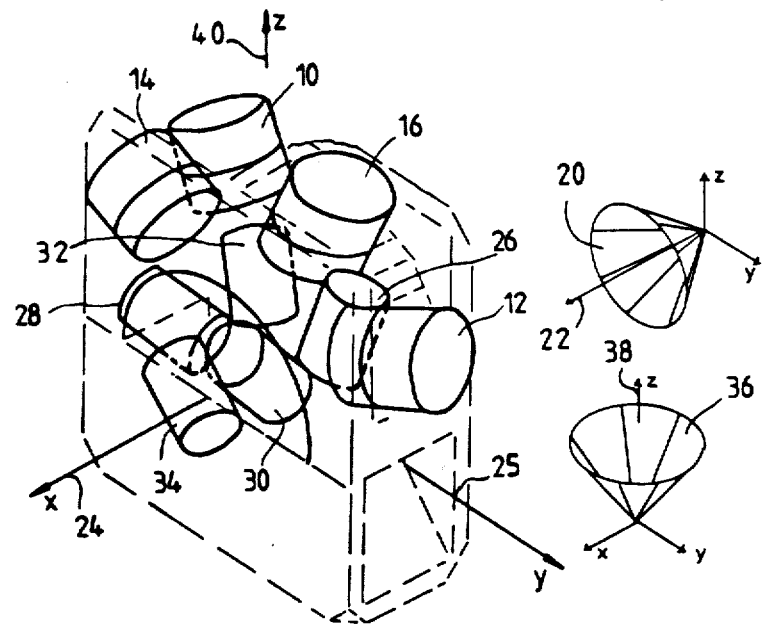
FIG. 1 is a perspective illustration and shows a sensor block having four two-axis rate gyros and five accelerometers as angular rate and acceleration sensors, respectively, and the orientation of the input axes of the sensors in a first embodiment of a reference device.
Figure 2:
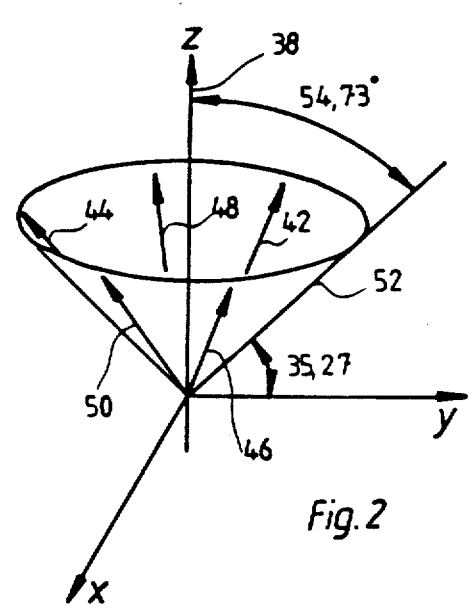
FIG. 2 is a schematic illustration and illustrates the orientation of the input axes of the acceleration sensors in the embodiment of FIG. 1.

The angular rate sensors are elecrically restrained, dynamically tuned two-axis gyros. The angular rate sensors have two input axes perpendicular to each other and to the spin axis. In the embodiment of FIG. 1 four such angular rate sensors 10,12,14 and 16 are provided. The eight input axes of the angular rate sensors 10,12,14,16 are orientated parallel to generatrices of a notional cone 20, where said generatrices are straight lines within the surface of the said cone, extending from the cones vertex as indicated in FIG. 1. The axis 22 of this notional cone 20 extends parallel to the longitudinal axis 24 (x) of the vehicle, that is the roll axis of the aircraft. The angular rate sensors 10,12,14 and 16 are located in a body 25 substantially on a semicircle about the longitudinal axis 24 of the vehicle or an axis parallel thereto. Five acceleration sensors 26,28,30,32 and 34 are located within this semicircular arrangement of angular rate sensors 10,12,14,16. The acceleration sensors 26,28,30,32 and 34 have input axes, which likewise are orientated parallel to the surfaces of a notional cone 36. This is indicated in FIG. 1. The axis 38 of this notional cone 36 extends parallel to the vertical craft axis 40 (z) of the vehicle and the aircraft, respectively. As illustrated more clearly in FIG. 2, the cone angle of this cone 36 is 54.73°. The input axes 42,44,46,48,50 of the five acceleration sensors 26,28,30,32 and 34 are determined by six generatrices equally distributed about the axis 38 of the cone 36: Each of the input axes 42,44,46,48 and 50 extends parallel to a respective one of these generatrices. This arrangement offers the possibility to provide, if required, a further sixth acceleration measuring device, the input axis of which would then extend parallel to the sixth generatrix 52. In the described arrangement the acceleration sensors 26,28,30 form with their input axes 42,44,46 an orthogonal coordinate system, which, however, is rotated with respect to the coordinate system formed by roll axis, pitch axis and vertical craft axis of the aircraft.

With the described arrangement a total of eight angular rate components are measured, namely two mutually orthogonal ones for each gyro. Furthermore, five acceleration components are measured.

The described arrangement manages with a minimum of accelerometers to obtain a failure behavior "fail-operational, fail-operational, fail-safe". FIGS. 3 and 4 show an alternative sensor arrangement 162, which requires a larger number of accelerometers, but with which the mounting and the maintenance are more simple.

In the arrangement according to FIGS. 3 and 4 four identical units 212,214,216 and 218 arranged in a semicircle in a body 210 are provided. Each of these units comprises a two-axis angular rate sensor and two accelerometers. The angular rate sensors are again two-axis rate gyros. The spin axes of the rate gyros extend radially. The input axes 228,230; 232,234; 236,238 and 240,242 of the rate gyros arranged in the units 212, 214,216 and 218, respectively, are located on a notional cone 244 having a cone angle of 90°. The sensitivity axes of the eight accelerometers coincide in this embodiment with the input axes of the angular rate sensors. Here the axis of the notional cone 244 is parallel to the aircraft-fixed pitch axis $Y_F$ of the aircraft 246.

As can be seen from FIGS. 3 and 4, the three aircraft-fixed roll, pitch and vertical craft axes are designated by $X_F$, $Y_F$ and $Z_F$, respectively. As will be described hereinbelow, the reference system supplies the angular rates p,q and r about these three aircraft-fixed axes.

Figure 5:
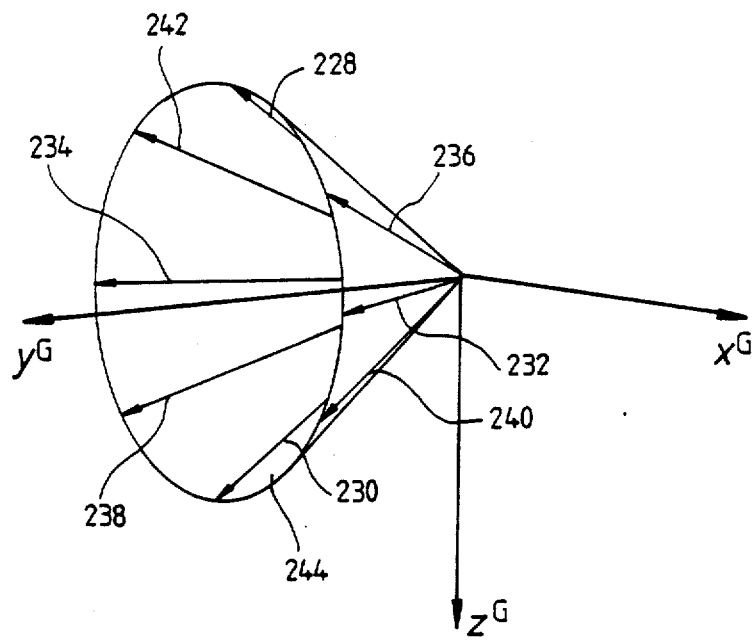
FIG. 5 is a schematic illustration and illustrates the spacial arrangement of the input axes of the two-axis angular rate sensors on the surface of a cone in the second embodiment of a reference device.
Figure 6:
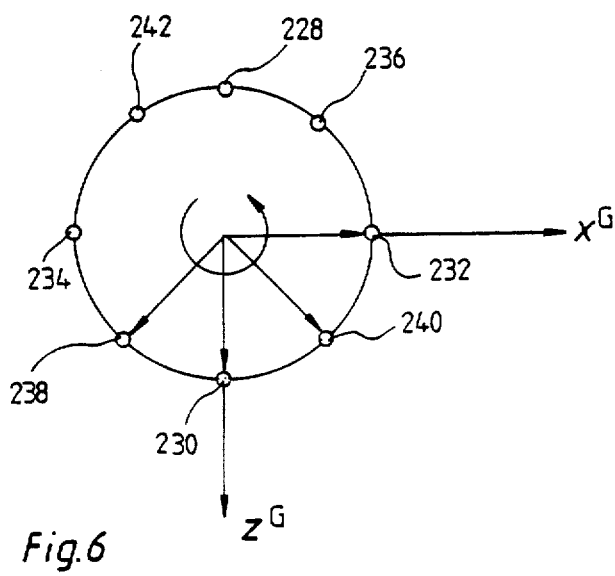
FIG. 6 is a projection of the cone of FIG. 5 on the x-z-plane.

FIGS. 5 and 6 show the geometry of the input axes.

As mentioned, the cone 244 has a cone angle of 90°. The input axes of each of the two-axis angular rate sensors are located in a plane passing through the cone axis. These planes are angularly spaced by 45°, as can be seen best from FIG. 6. The angular rates p, q and r about the aircraft-fixed axes $X_F$, $Y_F$ and $Z_F$ can be represented in different ways as linear combinations of the signals from angular rate sensors. In the same way the accelerations in the directions of the aircraft-fixed axes $X_F$, $Y_F$ and $Z_F$ can be represented in different ways as linear combinations of signals from acceleration sensors, the sensitivity axes of which are aligned with the directions 228 to 242. If the two signals of the angular rate sensor or of the acceleration sensors of the unit 212 are designated by $m_{1x}$ and $m_{1y}$, the two signals of the angular rate sensor or of the acceleration sensors of the unit 214 are designated by $m_{2x}$ and $m_{2y}$, the two signals of the angular rate sensor or of the aceleration sensors of the unit 216 are designated by $m_{3x}$ and $m_{3y}$ and the two signals of the angular rate sensor or of the accelerometers of the unit 218 are designated by $m_{4x}$ and $m_{4y}$, then the angular rates and the accelerations, respectively, in the directions of the $x_F$-, $Y_F$- and $Z_F$-axes result according to the following table:

|   | ROLL, p | PITCH, q | YAW, r |
|---|---|---|---|
| I | $\frac{1}{\sqrt{2}}(m_{2x} - m_{2y})$ | $\frac{1}{\sqrt{2}}(m_{1x} + m_{1y})$ | $\frac{1}{\sqrt{2}}(m_{1y} - m_{1x})$ |
| II | $(m_{3x} - m_{3y}) - \frac{1}{\sqrt{2}}(m_{1x} - m_{1y})$ | $\frac{1}{\sqrt{2}}(m_{2x} + m_{2y})$ | $(m_{3y} - m_{3x}) + \frac{1}{\sqrt{2}}(m_{2x} - m_{2y})$ |
| III | $(m_{4x} - m_{4y}) + \frac{1}{\sqrt{2}}(m_{1x} - m_{1y})$ | $\frac{1}{\sqrt{2}}(m_{3x} + m_{3y})$ | $(m_{4x} - m_{4y}) - \frac{1}{\sqrt{2}}(m_{2x} - m_{2y})$ |

-continued

| | ROLL,p | PITCH,q | YAW,r |
|---|---|---|---|
| IV | $\frac{1}{2}(m_3x - m_3y)$ | $\frac{1}{\sqrt{2}}(m_4x + m_4y)$ | $\frac{1}{2}(m_4x - m_4y)$ |
| | $+ \frac{1}{2}(m_4x - m_4y)$ | | $- \frac{1}{2}(m_3x - m_3y)$ |

Figure 7:
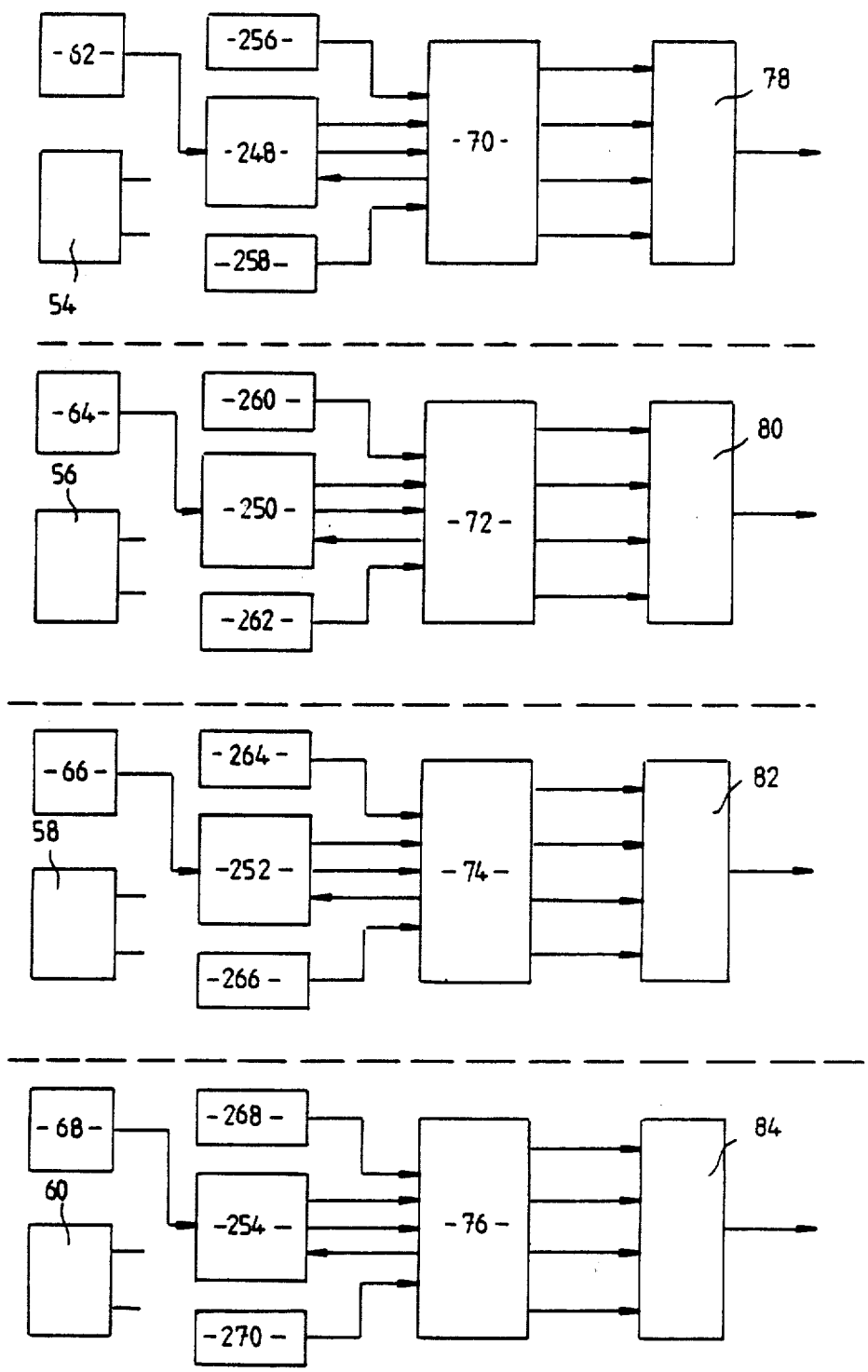
FIG. 7 is a block diagram of the sensor block.

The sensor block of FIG. 3 with the associated circuitry is illustrated as block diagram in FIG. 7.

The four angular rate sensors 248,250,252,254 are illustrated as blocks. Each of these angular rate sensors 248,250,252 and 254 has a separate power supply unit 54,56,58,60. Furthermore, each of the angular rate sensors 10,12,14,16 formed as two-axis gyros has a separate motor power supply 62,64,66,68. The measuring signals of the angular rate sensors 248,250,252,254 are applied to a signal processing unit 70,72,74,76 each.

Furthermore, the eight acceleration sensors 256,258; 260,262; 264,266; 268,270 in the form of conventional accelerometers are also illustrated as blocks. The acceleration signals from the acceleration sensors 256,258,260,262; 264,266; 268,270 are also applied to the signal processing unit 70,72,74,76. The acceleration sensors 256,258,260,262,264,266,268,270 are also supplied by the power supply units 54,56,58,60 of the angular rate sensors 248,250,252,254. Each signal processing unit 70,72,74,76 supplies to an associated register 78,80,82,84 two angular rate signals, namely one for each input axis of the associated angular rate sensor 248,250,252,254, and at least one acceleration signal. The angular rate signals are indicated by $\omega_1$, $\omega_2$, and $\omega_3$, $\omega_4$ and $\omega_5$, $\omega_6$ and $\omega_7$, $\omega_8$, respectively. The acceleration signals are indicated by $a_1$, $a_2$, $a_3$, $a_4$, $a_5$, $a_6$, $a_7$ and $a_8$.

Figure 8:
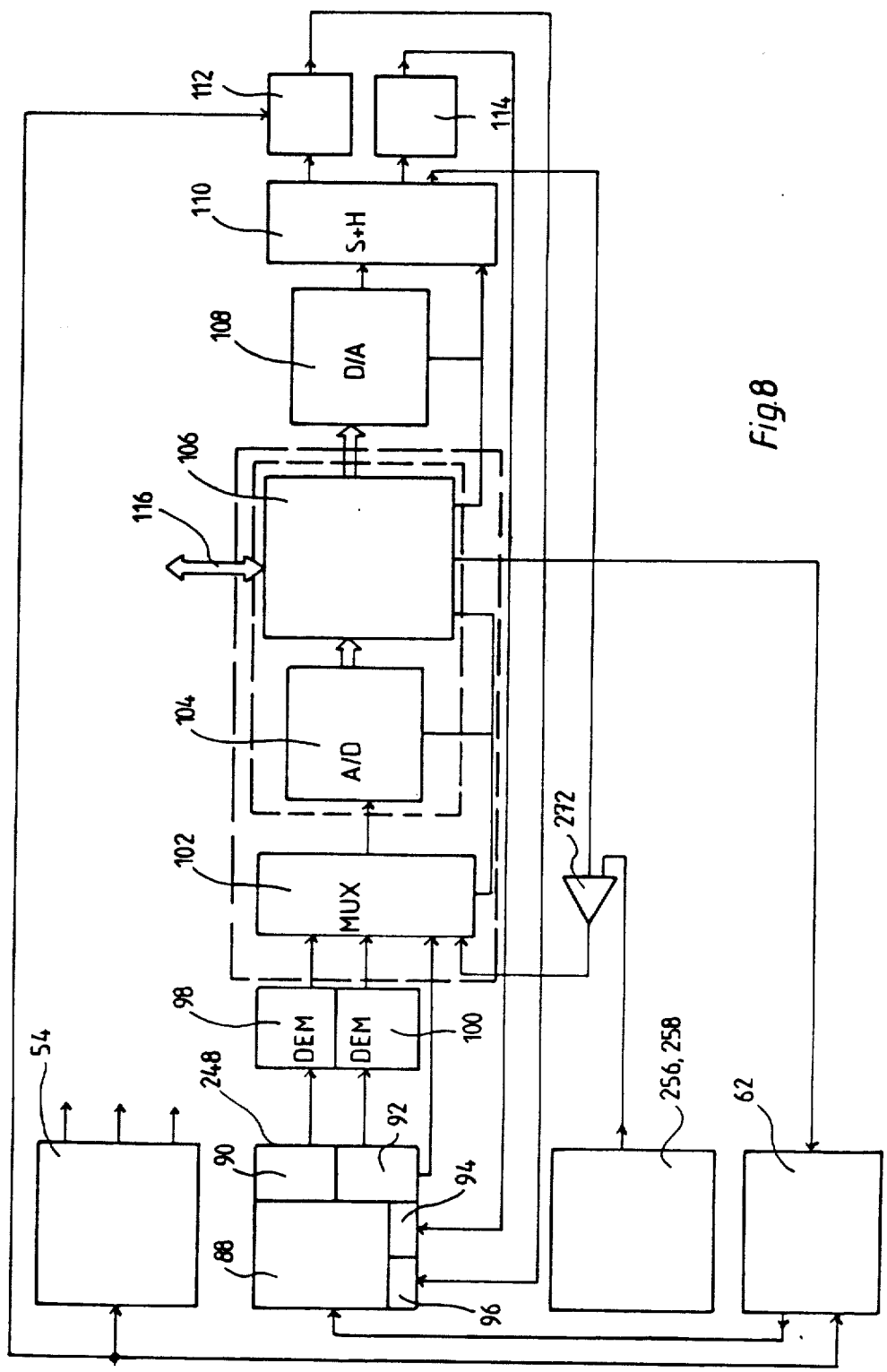
FIG. 8 is a slightly more detailed block diagram of a channel of the sensor block with a restraining circuit for an input axis of a rate gyro.

FIG. 8 shows in detail one of the channels separated by broken lines in FIG. 7, for example that one, which is associated with the angular rate sensor 248. Corresponding elements are designated in FIG. 8 by the same numerals as in FIG. 7.

The angular rate sensor 248 comprises a dynamically tuned gyro 88 having position pick-offs 90,92, which respond to movement of the gyro about one of the two mutually orthogonal input axes, respectively. Furthermore, the angular rate sensor 248 comprises two torquers 94 and 96, which are arranged to exert torques on the gyro 88 about one of the input axes, respectively. The torquer 94 is located on the input axis of the position pick-off 90. However, a signal which is derived from the position pick-off 92 is applied to the torquer 94. In the same way the torquer 96 is located on the input axis of the position pick-off 92. However, a signal which is derived from the position pick-off 90 is applied to the torquer 96. The torquers are thus crosswise energized by the position pick-offs. In this way, due to the characteristics of gyros, an electrical restraint of the gyro 88 in its center position is obtained. The torques required therefor and thus the signals, which cause these torques, are proportional to the angular rates about the input axes. The position pick-offs 90 and 92 are supplied with alternating current from the motor power supply 62 and thus supply alternating current signals as pick-off signals. The pick-off signals from the position pick-offs 90,92 are demodulated by demodulators 98, 100. The demodulated pick-off signals thus obtained are applied through a multiplexer 102 to an analog-to-digital converter 104. The analog-to-digital converter 104 therefrom forms digitized pick-off signals. The digitized pick-off signals are applied to a digital signal processing circuit 106. The digital signal processing circuit 106 supplies digital restraining signals for the angular rate sensor 248. These digital restraining signals are applied to a digital-to-analog converter 108. The digital-to-analog converter 108 generates analog restraining signals. Analog value storing means 110 (sample-hold-circuits) for the analog restraining signals are connected to the digital-to-analog converter 108. The analog value storing means 110 are connected through amplifiers 112,114 to the torquers 96 and 94, respectively, of the gyro 88 in the angular rate sensor 248. Hereby the gyro 88 is restrained in its center position in the described way.

Here the signal processing in the restraining loop is effected digitally. Also the angular rate signal in the digital signal processing circuit 106 is obtained and output in digital form, as indicated at 116. The analog-to-digital converter 104 and the signal processing circuit 106 also receive signals from the accelerometers 256,258 through amplifier 272 and the multiplexer 102. These signals are digitally output at 116. They also serve for compensation of gyro errors depending on the acceleration.

Figure 9:
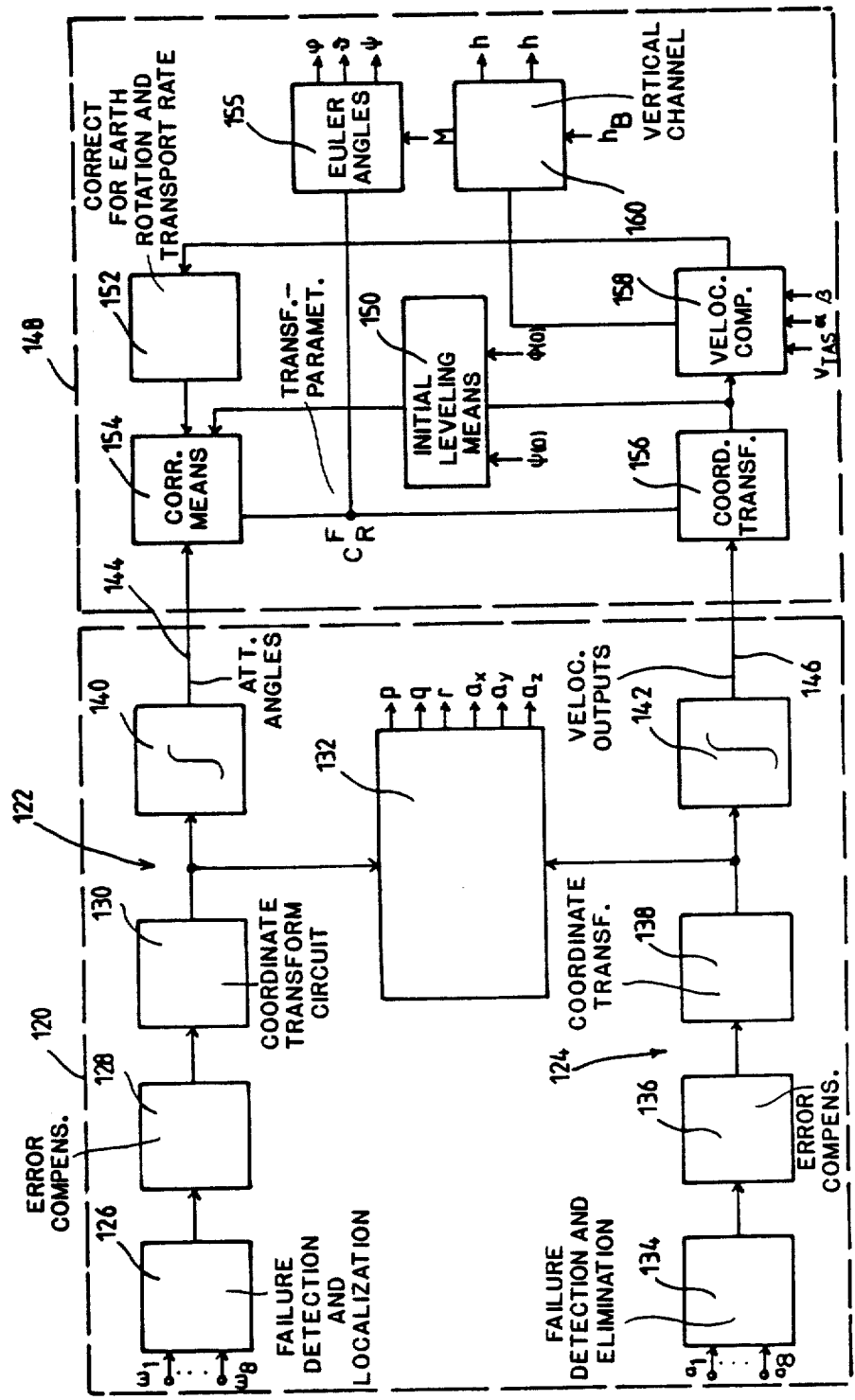
FIG. 9 is a block diagram and shows the further processing of the signals supplied from the sensor block.

In FIG. 9 the processing of the angular rate signals $\omega_1$ to $\omega_8$ and $a_1$ to $a_8$ thus supplied from the sensor block is illustrated as a block diagram.

Apart from said signals from the sensor block the following informations are supplied as input quantities to the signal processing means:

pressure altitude $h_B$
flying speed (true airspeed) TAS
magnetic declination
true initial heading $\psi$ (0)
geographic latitude in the initial point $\Phi$ (0)
angle of attack $\alpha$
angle of side-slip $\beta$
magnetic heading $\Psi$.

The signal processing means supply the following output quantities:

roll, pitch and yaw rate p,q,r in the vehicle-fixed coordinate system, longitudinal, transverse and vertical accelerations in the vehicle-fixed coordinate system, the Euler angles, namely roll angle $\phi$, pitch angle $\theta$ an true heading $\psi$, altitude h and
vertical speed h.

First signal processing means 120 are provided, to which the signals $\omega_1$ to $\omega_8$ and $a_1$ to $a_8$ are supplied from the sensor block. These first signal processing means supply corrected angular rate signals, namely the roll, pitch and yaw rate p,q,r with reference to a vehicle-fixed coordinate system, and corrected acceleration signals $a_x$, $a_y$, $a_z$, likewise with reference to a vehicle-fixed coordinate system. These output quantities are applied to an autopilot and serve for the stabilization of the aircraft.

The first signal processing means 120 comprise two channels: One channel 122 serves for processing the angular rate signals $\omega_1$ to $\omega_8$. A channel 124 serves for processing the acceleration signals $a_1$ to $a_8$. Means 126 for failure detection and localization are provided in the channel 122. The means for failure detection for the angular rate operate after the principle of majority monitoring (voting), as will be described hereinbelow. In the chosen geometric arrangement of the four two-axis rate gyros, four signals can be generated according to the table above by combination of the two output signals of the four gyros. These signals can be used for detection and localization of a failure by simple majority monitoring.

A first set of two gyros is used, which detect the three components of the angular rate. When a failure appears, a second set contained in a series of alternative sets with another combination of gyros is used for the measurement. In terms of face: A first angular rate sensor 248, a second angular rate sensor 250, a third angular rate sensor 252 and a fourth angular rate sensor 254 are provided. The first and second angular rate sensor 248 and 250 are used for measuring in undisturbed operation. From the signals from their four input axes the three components of the angular rate can be redundantly determined in four different ways. When a failure appears a change-over to other angular rate sensors not subjected to failure is effected. This change-over is effected in such a way, that the angular rate sensors are taken into consideration as alternatives in the following sequence:

third and fourth angular rate sensor 252 and 254
first and third angular rate sensor 248 and 252
first and fourth angular rate sensor 248 and 252
second and third angular rate sensor 250 and 252
second and fourth angular rate sensor 250 and 254.

A static and dynamic error compensation is effected in a circuit 128. The measuring signals from the angular rate sensors are corrected according to the measuring models of the angular rate sensors in order to obtain the required accuracies of the output signals. Numeral 130 designates a coordinate transformation circuit, by which the selected and corrected angular rate signals are transformed into a vehicle-fixed, that means aircraft-fixed, coordinate system. Therefrom the roll rate p, the pitch rate q and the yaw rate r are computed in a circuit 132 and output to the autopilot for stabilization.

In similar way the acceleration signals $a_1$ to $a_8$ are treated in the channel 124. Numeral 134 designates means for failure detection and elimination. For determination of a failure, linear combination and comparison means are provided for the acceleration signals $a_1$ to $a_8$. By the comparison means each acceleration signal measured by an acceleration sensor 256,258,260,262,264,266,270, for example the signal $a_3$ of the acceleration sensor 260, is compared with a comparison value. The comparison value is formed from the acceleration signals, for example $a_1$, $a_2$, $a_4$, $a_5$ . . . , of all the other acceleration sensors. A failure is signalized when the difference between acceleration signal ($a_3$) and comparison value exeeds a predetermined threshold value. Locating means are provided. When a failure appears, the locating means determine the acceleration sensor subjected to failure from the subset of the acceleration sensors, for which the associated linear combination and comparison means indicate exceeding of the threshold value.

This will be described in detail hereinbelow.

Numeral 136 designates a circuit, in which a static and dynamic error compensation is effected. The measuring signals from the acceleration sensors 256 to 270 are corrected according to the measuring models of the acceleration sensors in order to obtain the required accuracies of the output signals. Also these selected and corrected acceleration signals are transformed by a coordinate transformation circuit 138 into a vehicle-fixed coordinate system. The longitudinal acceleration $a_x$, the transverse acceleration $a_y$ and the vertical acceleration $a_z$ are supplied from the circuit 132 to the autopilot for stabilization.

In the first channel 122 the first signal processing means 120 have furthermore first integrating means 140 for integrating the transformed angular rate signals from the coordinate transformation circuit 130. The first signal processing means 120 have likewise in the second channel 142 second integrating means 142 for integrating the transformed acceleration signals from the coordinate transformation circuit 138.

The first signal processing means 120 supply transformation parameters at attitude outputs 144, these transformation parameters resulting from integration of angular rate information. The first signal processing means 120 supply velocity values at velocity outputs 146, these velocity values resulting from integration of acceleration information $a_x$, $a_y$, $a_z$ in a vehicle-fixed coordinate system. The selected and corrected angular rate and acceleration signals integrated by integrating means 140 and 142, respectively, are supplied to second signal processing means 148. The second signal processing means supply, among others, heading and attitude reference signals.

The second signal processing means 148 comprise initial levelling means 150 for the determination of initial values of the transformation parameters. Furthermore, the second signal processing means comprise means 152 for the determination of correction values for taking earth rotation and transport rate into account. Correcting means 154 are provided for correction of the transformation parameters with respect to initial values, earth rotation and transport rate. These transformation parameters appear at the attitude outputs 144 of the first signal processing means. Thus, transformation parameters are obtained for the transformation of vectors from a vehicle-fixed, that means aircraft-fixed, coordinate system into an earth-fixed coordinate system.

The second signal processing means 148 comprise a coordinate transformation circuit 156, which operates with the corrected transformation parameters from the correcting means 154. The velocity values appearing at the velocity outputs 146 of the first signal processing means are transformed by the coordinate transformation circuit into an earth-fixed coordinate system. Thus transformed velocity components, which velocity components are obtained by integration of acceleration components with the vehicle at rest are applied to the initial levelling means 150. Such acceleration components can only be caused by the acceleration due to gravity. The velocity components measured in this way thus form a measure of the initial inclination of the vehicle, and can be used for the initial levelling. Furthermore, an external initial heading information$\psi$ (0) is applied to the initial levelling means 150. They also obtain information as to the initial geographic latitude$\Phi$ (0).

The corrected transformation parameters from the correcting means 154 are applied to a circuit 155 for calculation and output of the Euler angles $\phi$, $\theta$, and $\psi$. The means for output of the Euler angles comprise means for aiding the heading angle through the magnetic heading. They also supply the magnetic deviation M.

The second signal processing means 148 comprise velocity computer means 158. The velocity values transformed by the coordinate transformation circuit 156, the flying speed (true airspeed) TAS as well as angle of attack $\alpha$ and angle of side-slip $\beta$ are supplied to the velocity computer means 158. The velocity computer means 158 applies velocity components to the means 152 for determination of correcting values for taking the earth rotation and transport rate into account. Furthermore, the velocity computer means 158 applies velocity components to a vertical channel 160 aided by the pressure altitude $h_B$. This vertical channel supplies flight altitude and vertical velocity.

Figure 10:
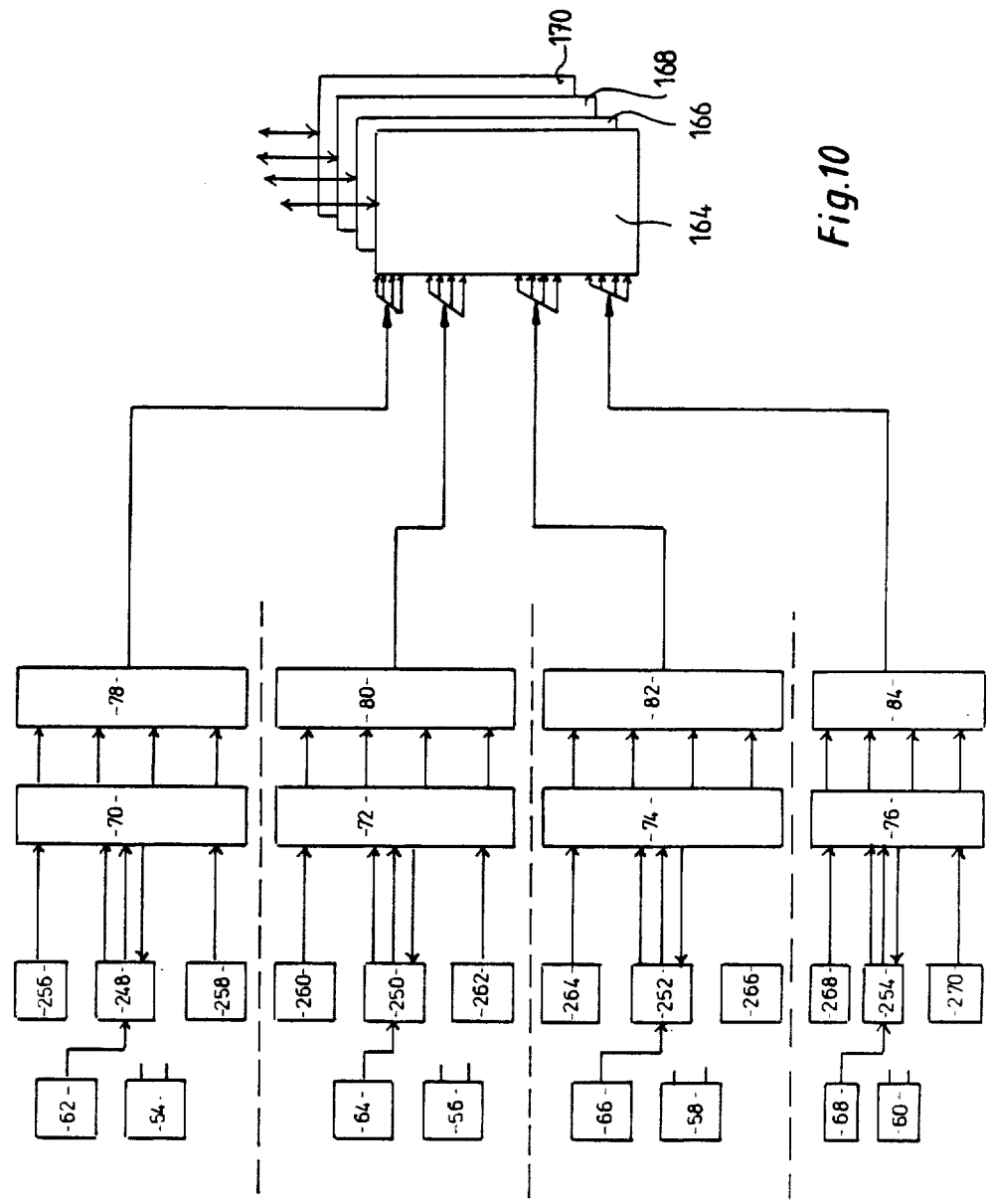
FIG. 10 illustrates the redundance of the signal processing for the heading-attitude reference.

FIG. 10 shows, on the left, the sensor block 162, as described in connection with FIG. 7. Each of the four sets of output signals obtained therewith is applied parallel to four signal processing circuits 164,166,168,170, each of which is constructed according to FIG. 9 with first and second signal processing means 120,148 and supplies stabilization and heading and attitude reference information to a flight control computer.

Figure 11:
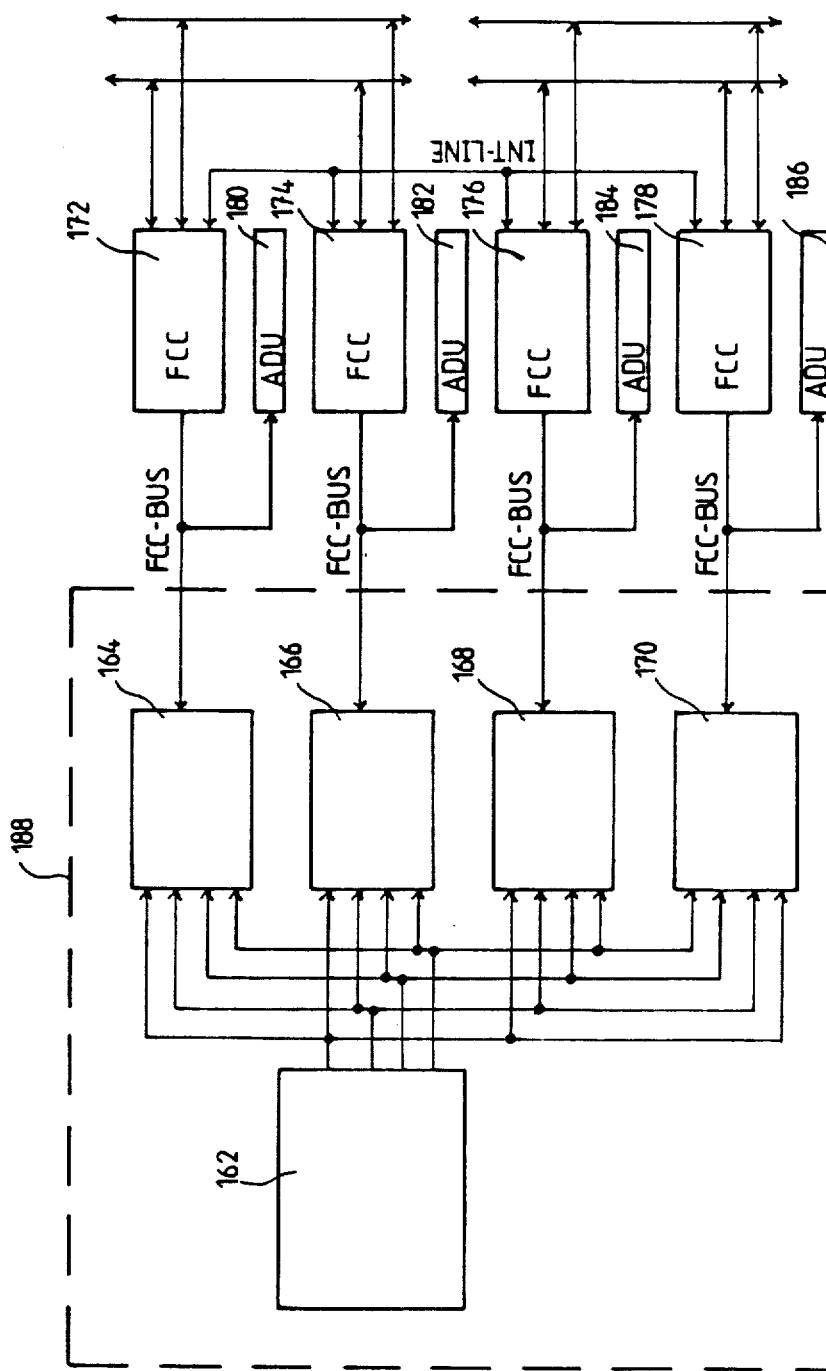
FIG. 11 illustrates the cooperation of the redundant signal processing circuit with the likewise fourfold-redundant flight control computer.

FIG. 11 shows how also the flight control computer and the ADU are multiply provided. Each of the signal processing circuits 164,166,168 and 170 supplies data for an associated flight control computer 172,174,176 and 178, respectively, and an ADU 180,182,184 and 186, respectively.

The integrated redundant reference system comprises the portion illustrated in FIG. 11 within the bordering 188.

Figure 12:
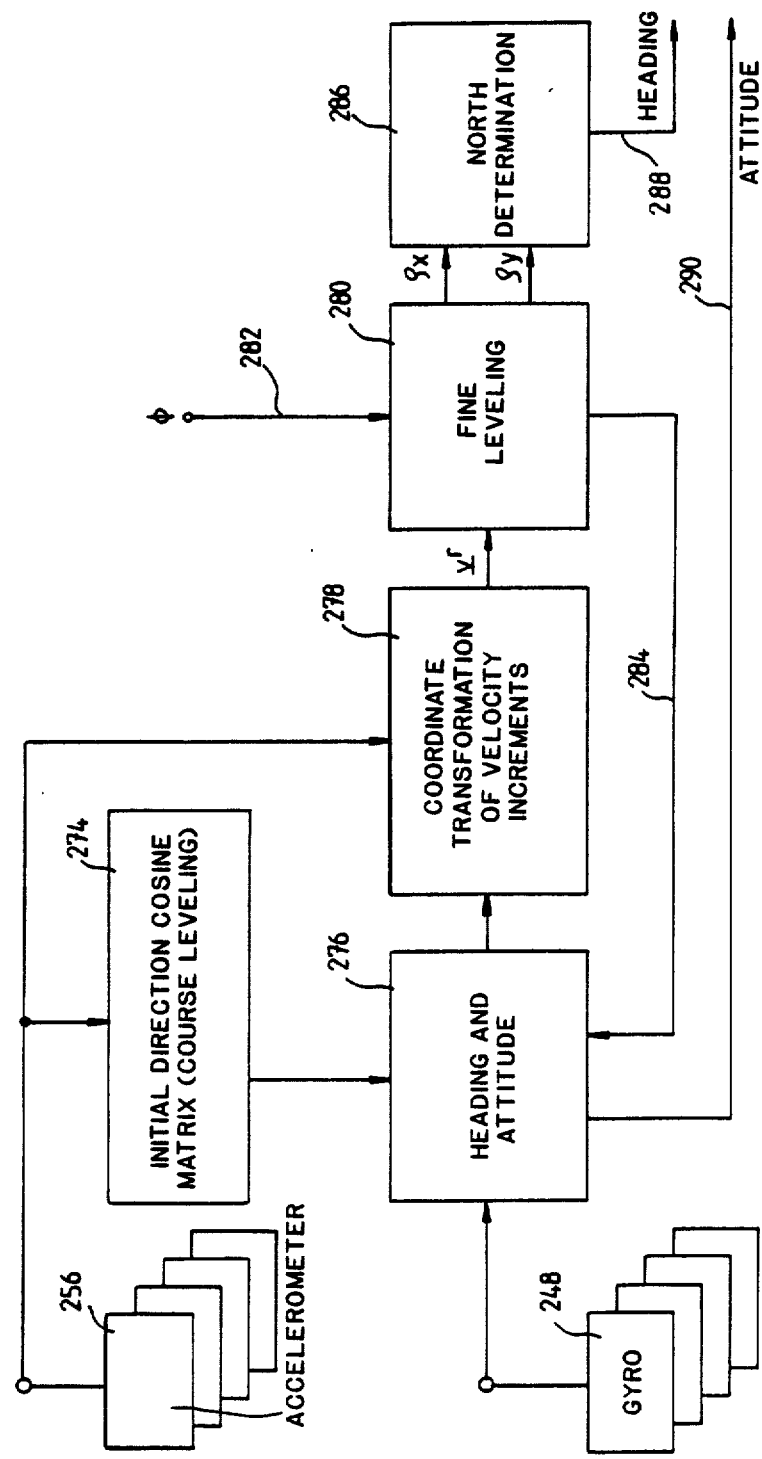
FIG. 12 is a block diagram and illustrates a coarse levelling of the reference device before the start.

Before the takeoff a levelling is effected through the circuit 150 (FIG. 9). That is illustrated in greater detail in FIG. 12. The acceleration sensors supply pulses, which each represent a velocity increment. According to these signals a fast coarse levelling can be effected. The measured accelerations with stationary aircraft are only due to the acceleration due to gravity and thus supply measuring values representing the initial inclination of the aircraft in the form of an initial direction cosine matrix or of a quaternion. This is illustrated by block 274. The angular rate sensors supply signals, each of which represents an angular increment. These signals are subjected to a signal processing illustrated by block 276, to which the direction cosine matrix of the coarse levelling is applied, for continuous calculation of new heading and attitude angles and for compensation of sensor errors. With the continuously obtained and updated direction cosine matrix, a coordinate transformation of the velocity increments of the acceleration sensors is effected as well as a sensor error compensation of the acceleration sensors. This is illustrated by block 278. Thereby an inertial measured velocity vector $v^r$ referred to an earth-fixed coordinate system is obtained. The velocity vector $v^r$ is applied to a circuit 280 for fine levelling. Furthermore the geographical latitude is applied to this circuit 280, as indicated by input 282. The circuit 280 for the fine levelling supplies correction values for the direction cosine matrix, which is taken into account in the signal processing according to block 276, as indicated by the connection 284. The circuit 280 for the fine levelling furthermore supplies "actuating signals" $\rho_x$ and $\rho_y$, which counteract the drifting of a "virtual" platform due to the components of the angular rate of the earth. If the horizontal line would be illustrated by a real, gimbal suspended platform kept horizontal by sensor controlled servomotors, then the components of the angular rate of the earth would act on the angular rate sensors. These component would cause a rotation of the platform relative to the earth-fixed coordinate system. Vertical sensors on the platorm would on the other supply actuating signals, which keep the platform horizontal. These actuating signals are indicative of the components of the angular rate of the earth and permit the determination of the north direction. With a strap down arrangement a "virtual" platform is defined by the direction cosine matrix. "Actuating signals" arise—analog to the actuating signals applied to servomotors of a real platform—which keep this virtual platform horizontal. From these actuating signals the heading angle to the north can be determined. The signal processing required therefor is illustrated in FIG. 12 by the block 286. An output 288 supplies the initial heading, and an output 290 of the block 276 supplies the initial attitude angle.

Figure 13:
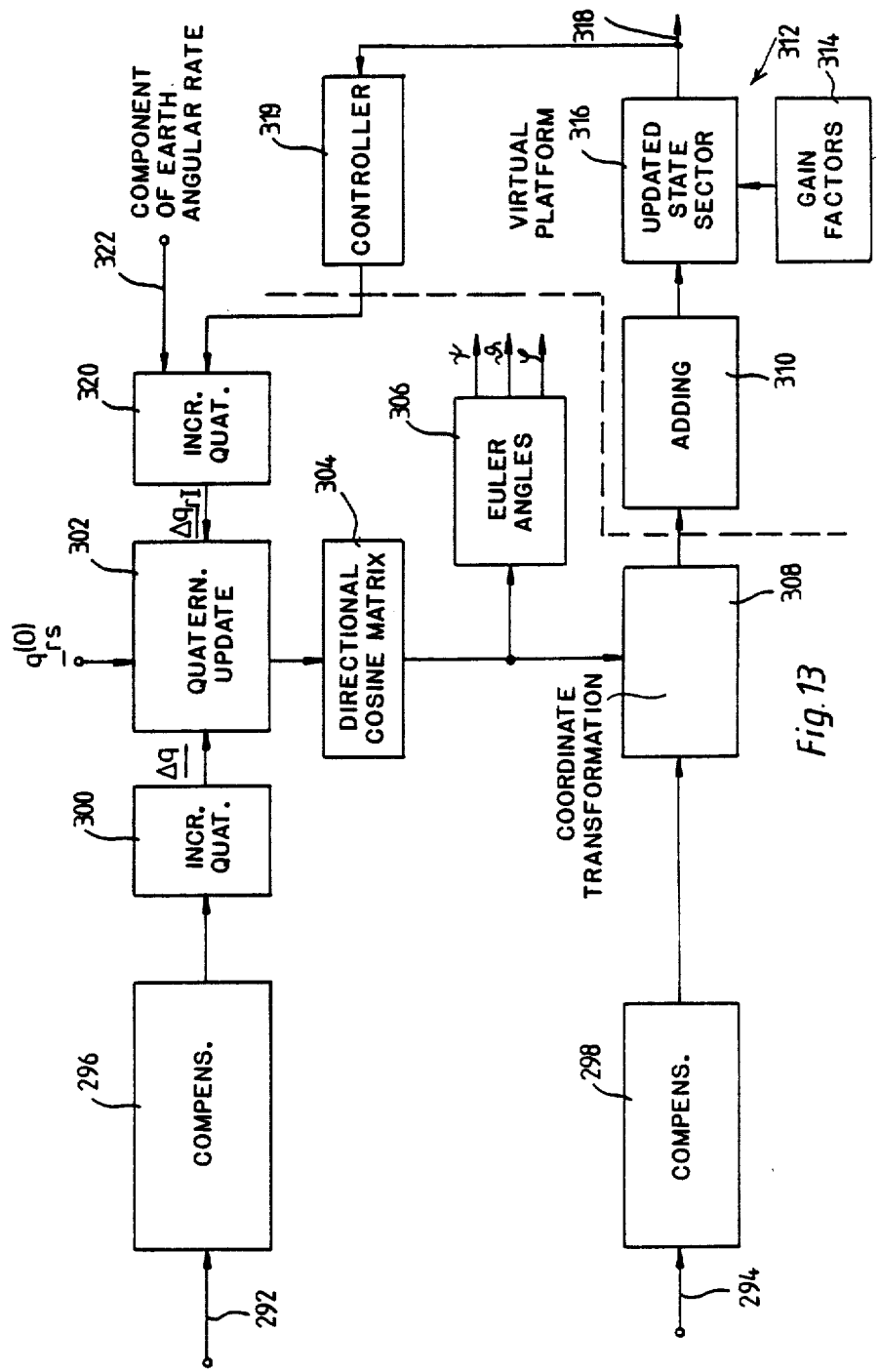
FIG. 13 is a block diagram of the fine levelling of the reference device.

In FIG. 13 the fine levelling is illustrated in detail.

Signals from the angular rate sensors and the acceleration sensors, respectively, occur at inputs 292 and 294, each of these signals representing an angular increment and a velocity increment, respectively. The angular rate signals and the acceleration signals, respectively, are compensated with regard to "coning" and "sculling", respectively, and sensor errors, as illustrated by blocks 296 and 298, respectively. Incremental angular rate and velocity vectors, respectively, result. The incremental angular rate vector is converted into an incremental quaternion. This is illustrated by block 300. Thus an updated value of the quaternion is continuously corrected starting from an initial value. This is illustrated by block 302. The updated value of the quaternion thus obtained is converted into the direction cosine matrix by a signal processing illustrated by block 304. As illustrated by block 306, the Euler angles, that are heading and attitude angle $\psi$, $\theta$, $\phi$ are formed from the direction cosine matrix. As illustrated by block 308, the direction cosine matrix causes transformation of the velocity increments from the strap down system into an earth-fixed coordinate system.

The velocity increments are filtered and added up by a circuit 310, such that a velocity vector is obtained in the earth-fixed coordinate system. This velocity vector is applied to a Kalman filter, which simulates the "virtual platform". Block 314 supplies the amplification factors of the Kalman filter 312. Block 316 illustrates the formation of an updated state vector. The Kalman filter 312 supplies estimated values for the heading and attitude errors. These are output at an output 318. They make it possible for the pilot to observe the progress of the pre-alignment of the inertial navigation system. The vector of the heading and attitude errors is applied to a "controller" 319, which supples a vector of actuating signals. These actuating signals are converted into an incremental quaternion, which is illustrated by block 320. These signals, as actuating signals, counteract misalignment of the calculated earth-fixed coordinate system relative to the real earth-fixed coordinate system (or a misalignment of a "virtual platform"). In this signal processing furthermore the horizontal component of the angular rate of the earth determined by the geographical latitude is used. This component is input at an input 322. The conversion is similarly effected as that illustrated by block 300. The updated quaternion formed according to block 302 is also corrected by this incremental quaternion.

Due to the fact, that the quaternion is used in the updating of the attitude on one hand through the angular increments of the angular rate sensors and, on the other hand, through the "actuating signals" of the "virtual platform", and the change-over to the direction cosine matrix is only effected from the updated quaternion, the calculation effort is reduced. The direction cosine matrix namely is heavily redundant and it would require a higher calculation effort to carry out the calculation with the direction cosine matrix from the beginning. However, for forming the Euler angles and the transformation of the velocity, the direction cosine matrix is more favorable.

The portion separated by the broken line in FIG. 13 corresponds to a "virtual platform".

The principle of the alignment of a "virtual platform" in a strap down arrangement is described in German patent application No. 3,233,612.

FIG. 14 illustrates how an equation, shown in box 576, determines the number of possible combinations Z of n gyros (2) out of a total number of N gyros (4). A total of six possible combinations of systems 575 (k1,k2; k1,k3; k1,k4; k2,k3; k2,k4; and k3,k4) can be established by utilizing any two of the four two-axis angular rate sensors 248,250,252 and 254, each of these systems permitting measurement of the angular rates about three coordinate axes with two two-axis angular rate sensors.

FIG. 15 illustrates the principle of majority monitoring for the pitch rate. With the arrangement of the angular rate sensors according to FIGS. 3 and 4, the pitch rate can be determined from the two signals of each individual two-axis angular rate sensor. The pitch axis $y_F$ namely is located in the plane of each pair of input axes, for example 228,230, and in the median line of these input axes. Thus the pitch rate q results fourfold from the signals $G_{1x}, G_{1y}$ etc. of the four angular rate sensors according to the equation indicated in FIG. 15. Then a defective angular rate sensor can be recognized by the fact, that its pitch rate signal q differs from a signal formed from the signals of the other angular rate sensors by more than a predetermined threshold value.

In FIG. 15 it is furthermore illustrated in table form, which information about the angular rates, about the roll axis and about the yaw axis, (compare the table above) are still valid, when the majority monitoring with reference to the pitch rate signalizes the failure of an angular rate sensor.

Figure 16:
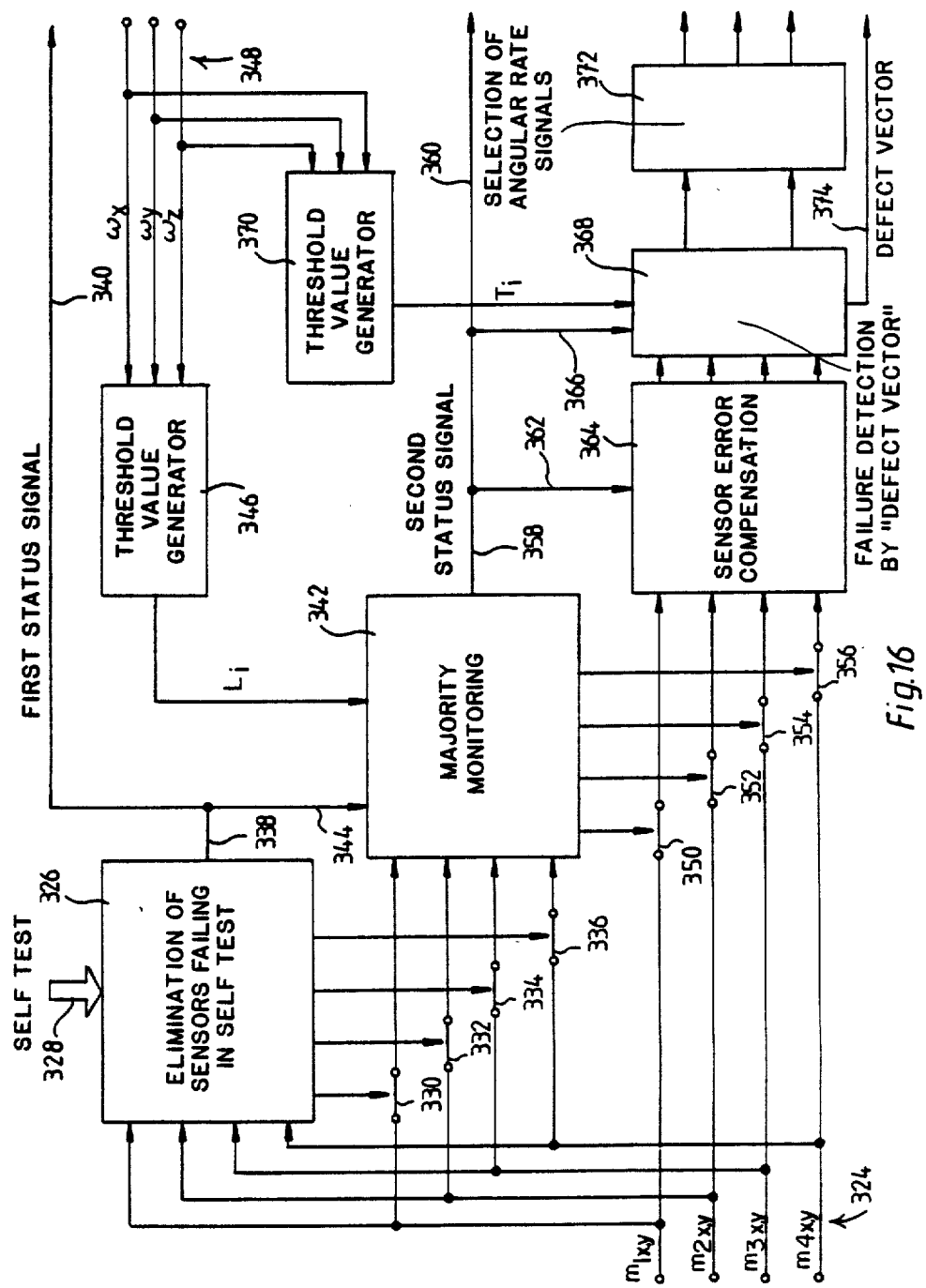
FIG. 16 is a block diagram and illustrates the selection of the measuring data obtained from the angular rate sensors for the further processing.

FIG. 16 is a block diagram and illustrates the selection of the signals for the formation of the angular rate signals. This corresponds approximately to the block 126 in FIG. 9.

A total of eight angular rate signals from the four two-axis angular rate sensors 248,250,252,254 appear at inputs 324. These signals are designated by $m_{1x,y}, m_{2x,y}, m_{3x,y}$ and $m_{4x,y}$. The signals are applied to a circuit 326. Information about the result of a self-test of the angular rate sensors is applied to this circuit 326 at an input 328. The self-test comprise for example whether the driving motor of the gyro rotor is supplied with current or the whether pick-offs obtain supply voltage or whether the restraining loop of the two-axis rate gyro is closed. The self-test can also comprise a test whether the measuring results are reasonable. Angular rate sensors recognized as defective in this self-test are excluded from the subsequent majority monitoring. This is symbolized by switches 330,332,334,336 in FIG. 16. On the basis of the self-test the circuit 326 supplies a first status signal at an output 338. This first status signal is supplied to the flight control computer through line 340. The majority monitoring due to the pitch velocity as explained above with reference to FIG. 15 is effected by a circuit 342 (or a calculation operation in the computer with the same effect). Also the first status signal is applied to the circuit 342 through an input 344. The circuit 342 furthermore obtains threshold values $L_i$ from a first threshold value generator 346 for the permitted deviation of a measuring value for example from the mean value of all other measuring values. The threshold values $L_i$ are dependent on the absolute amount of the angular velocities. Therefore, the angular rate signals finally selected and resulting, which are applied from the output of the circuit to an input 348 are applied to the threshold value generator 346. The circuit 342 eliminates measuring values from angular rate sensors, the pitch velocity measuring value of which differs from the mean value of the other angular rate sensors. This is symbolized by switches 350,352,354,356. The circuit 342 supplies a second status signal at an output 358. The status signal is applied to the flight control computer through line 360. Furthermore it is applied to an input 362 of a circuit 364 and to an input 366 of a circuit 368. The circuit 364 obtains the non-eliminated measuring values $m_{1x,y}$ etc. The circuit 364 causes comprehension of remaining sensor errors to an accuracy required for the flight control. The measuring values thus compensated for are then applied to the circuit 368. This circuit 368 is illustrated in detail in FIG. 17. The circuit 368 causes a failure detection and elimination by means of a "defect vector", as will be explained hereinbelow. Threshold values $T_i$ from a second threshold value generator 370 are applied to the circuit. Also the threshold values $T_i$ of the second threshold value generator are dependant on the amount of the final angular rates and therefore the angular rates from the input 348 are applied thereto. Through the circuit 368 a set of angular rate values $\omega_{1x,y}, \omega_{kx,y}\ldots$ is output. These angular rate values are all useful and are supplied by intact angular rate sensors. Then, according to some instruction, a selection of two angular rate sensors can be made, the signals of which can be further processed. The signals of the selected angular rate sensors are combined in a circuit 372 according to the geometry, such that three angular rates $\omega_x, \omega_y, \omega_z$ about mutually orthogonal axes are obtained. The defect vector is output at an output 374.

Figure 17:
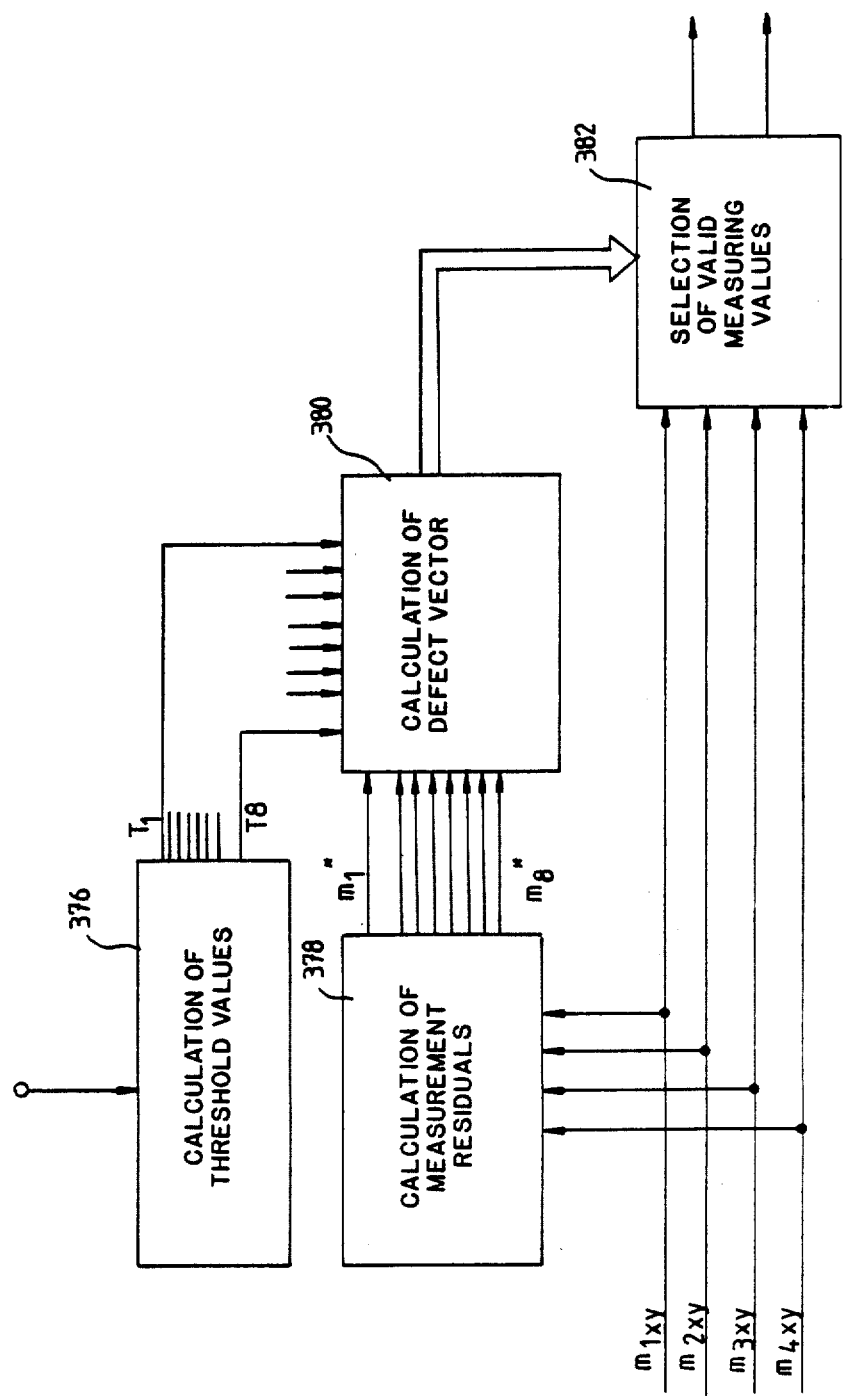
FIG. 17 is a block diagram and illustrates the basic principle of the localization and elimination of the measuring data subjected to error.

The failure detection and elimination by means of a "defect vector" is illustrated in detail in FIG. 17.

A circuit 376 obtains as input signal the vector of the angular rates in an aircraft-fixed coordinate system and the vector of the accelerations, likewise in an aircraft-fixed coordinate system. Therefrom the circuit 376 calculates a set of eight threshold values $T_1$ to $T_8$ depending on the mission. The measuring values $m_{1x,y}, m_{2x,y}, m_{3x,y}, m_{4x,y}$ are applied to a circuit 378. The circuit 378 calculates the measurement residuals, that are the deviations of the individual measuring values from a quantity formed from all remaining measuring values, for example the mean value of all values formed from the remaining measuring values and corresponding to this measuring value. The thus formed eight "measurement residuals" $m^*_1$ to $m^*_8$ are applied to a circuit 380. Also the eight threshold values $T_1$ to $T_8$ are applied to the circuit 380. Therefrom the circuit 380 calculates a "defect vector" d in dependence on, which of the measurement residuals exeed the associated threshold values. This defect vector is a logic vector consisting of the values "0" or "1". This defect vector is applied to a logic circuit 382. According to the defect vector d the logic circuit selects from the applied measuring values $m_{1x,y}$ etc. a set of valid measuring values for the further processing.

The failure detection by means of the "defect vector" differs substantially from the majority monitoring according to circuit 342 in FIG. 16. There one and the same quantity is measured by the different angular rate sensors 248 to 254 and these measuring results are compared. With the formation of the defect vector, however, each measuring quantity is compared to a quantity of the same type, which is formed from all the other measuring quantities. For example the angular rate about the input axis 228 (FIG. 4) is, on one hand, represented as linear combination of the angular rates about the input axes 236 and 242 and, on the other hand, represented as linear combination of the angular rates about the input axes 238 and 240, and the mean value is formed from the thus obtained values. The measurement residual would then be the difference between the measuring value of the input axis 228 and this mean value.

Figure 18:
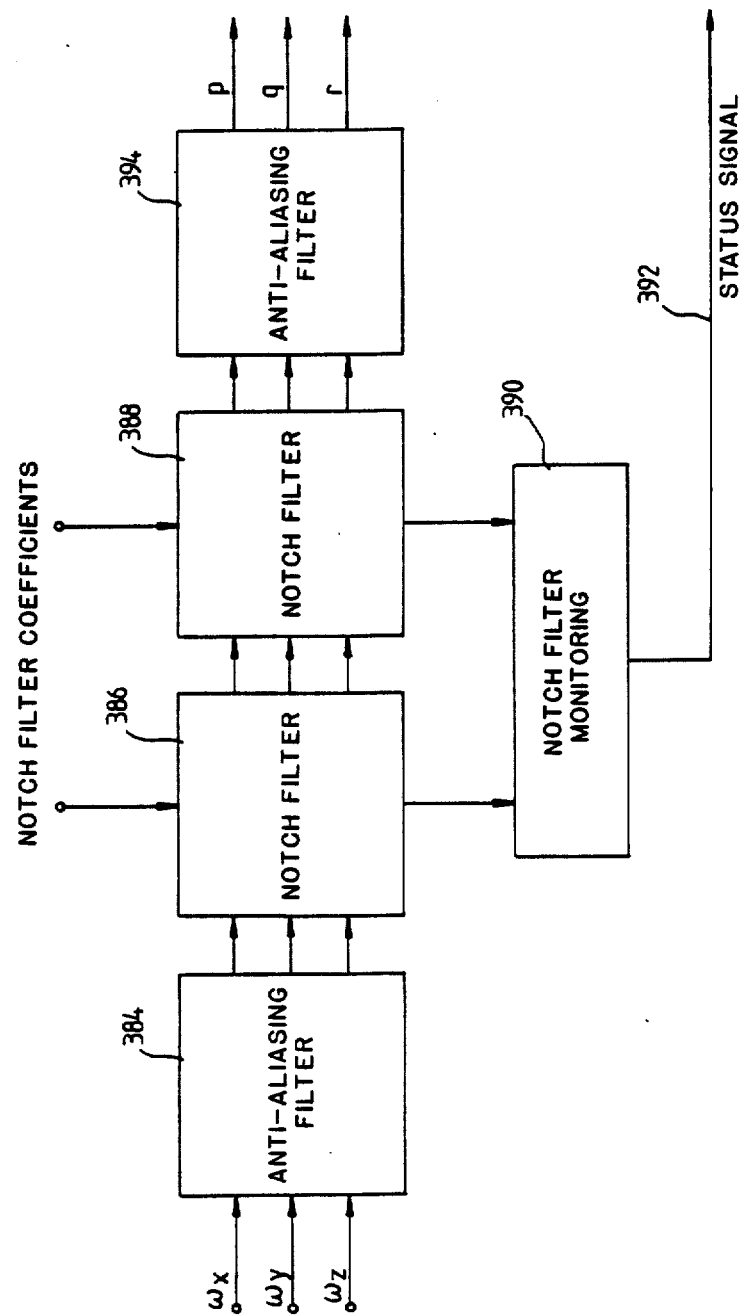
FIG. 18 is a block diagram and shows the further processing of the signals supplied by the angular rate sensors and selected according to FIG. 16 for generating the three signals representing the angular rates about the aircraft-fixed axes.

FIG. 18 is a block diagram and shows the further processing of the signals supplied by the angular rate sensors and selected according to FIG. 16 for generating the three signals representing the angular rates about the aircraft-fixed axes.

The three signals $\omega_x, \omega_y, \omega_z$ obtained according to FIG. 16 are applied to a first anti-aliasing filter 384. The output signals of the anti-aliasing filter 384 are successively applied to notch filters 386 and 388 for about 8 hertz and about 60 hertz, respectively. These notch filters eliminate natural oscillation frequencies of the aircraft, which could lead to instabilities in the flight control. These notch filters obtain a notch filter coefficient from the flight control computer. The notch filters 386 and 388 are monitored by a notch filter monitoring means 390. The notch filter monitoring means 390 supplies through a line a status signal 392. A further anti-aliasing filter 394 is connected to the output of the notch filters 386 and 388. The anti-aliasing filter 394 supplies, for further processing, the angular rates p,q and r about longitudinal, pitch and vertical craft axes.

Figure 19:
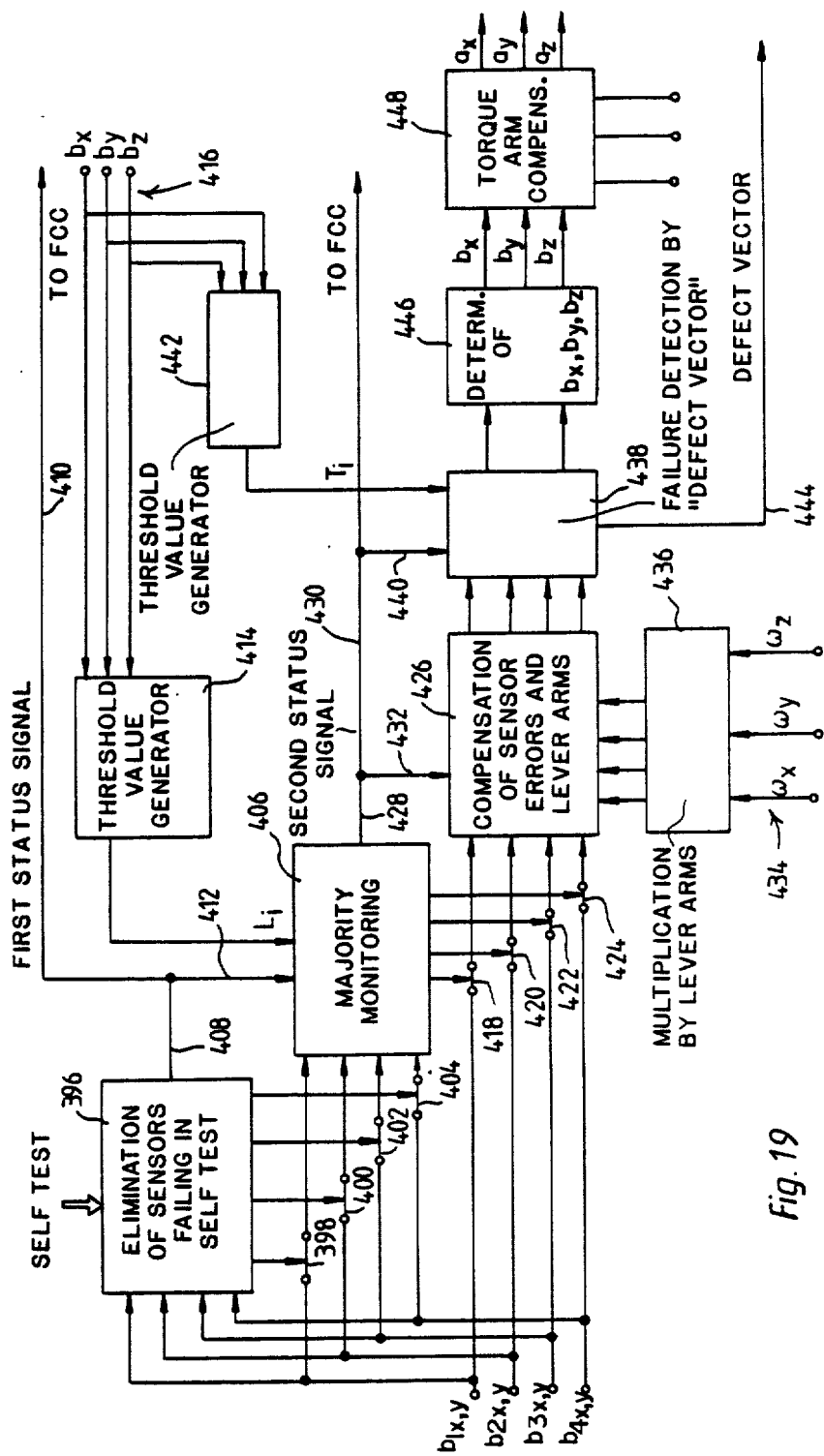
FIG. 19 is a block diagram and illustrates the selection and the lever compensation of the measuring data obtained from the acceleration sensors for the further processing.

FIG. 19 is a block diagram and shows the failure detection and elimination for the accelerations. From the four units 212,214,216 and 218 a total of four pairs of acceleration measuring values are supplied. These pairs are designated by $b_{1x,y}, b_{2x,y}, b_{3x,y}$ and $b_{4x,y}$. Also here a self-test is effected by a circuit 396, including a test, whether the obtained measuring values are resonable. Acceleration measuring values are eliminated when they are subjected to failure in this test. This is symbolized in FIG. 19 by switches 398,400,402,404. A circuit 406 makes a majority monitoring on the basis of values supplied from the different units 212 to 218 for the transverse acceleration of the aircraft, that is the acceleration in the direction of the $y_F$-axis, The circuit 396 supplies a first status signal at an output 408. This first status signal is applied through a line 410 to the flight control computer and is applied to an input 412 of the circuit 406 for the majority monitoring. Furthermore, threshold values $L_i$ from a first threshold generator 414 are supplied to this circuit 406. The threshold values are depending on the accelerations $b_x, b_y, b_z$, which finally result for the three aircraft-fixed axes. These accelerations are therefore applied to the threshold value generator through an input 416. The threshold values are furthermore dependant on the lever arms, on which the acceleration sensors are located relative to the center of mass of the aircraft. The lever arms are also taken into account in the threshold value generator 414. The circuit 406 eliminates the measuring values from those units 212 to 218, the transverse acceleration measuring value of which differs from the mean value of the other units by more than the threshold value. Therewith the measuring values from units 212 to 218 already eliminated by the self-test are not taken into account. The elimination of measuring values is symbolized by switches 418,420,422, 424.

The remaining pairs of measuring value $b_{1,x,y}$, etc. are then applied to a circuit 426. The circuit 426 causes compensation of the sensor errors to the accuracy required for the flight control.

The circuit 406 for majority monitoring supplies a second status signal at an output 428. This second status signal is applied to the flight control computer through a line 430. The second status signal is also applied to an input 432 of the circuit 426.

Furthermore, a lever arm compensation is effected in the circuit 426. To this end the the angular rates $\omega_x, \omega_y, \omega_z$ are applied at an input 434 to the circuit of FIG. 19. These angular rates are multiplied with lever arms in a circuit 436. The circuit 436 thus supplies correcting values for the acceleration measuring values. As known, an angular rate simulates an acceleration at an acceleration sensor, which is located at a distance from the center of mass of the aircraft. This apparent acceleration must be compensated for to obtain the acceleration of the aircraft.

The thus compensated acceleration values are then applied to a circuit 438 for failure detection and elimination on the basis of a "defect vector". This circuit receives the second status signal at an input 440. Furthermore, the circuit 438 receives threshold values $T_i$ from a second threshold value generator 442. The acceleration measuring values from the input 416 are applied to the second threshold value generator.

The circuit 438 is principally structured exactly in the same way as the circuit of FIG. 17 and is therefore not described in detail again. The circuit 438 outputs the defect vector for the acceleration at an output 444. Furthermore, it supplies a set of selected acceleration measuring values $b_{1x,y}$ and $b_{kx,y}$, which are supplied by two intact units 212 etc. The accelerations $b_x, b_y$ and $b_z$ in the directions of the three aircraft-fixed coordinate axes are determined from these acceleration measuring values in a circuit 446. A circuit 448 causes a moment arm compensation and supplies three output signals $a_x, a_y$ and $a_z$ corresponding to the accelerations in the directions of the aircraft-fixed coordinate axes for the flight control. To this circuit 448 also the angular rates about the three aircraft-fixed coordinate axes are applied.

Figure 20:
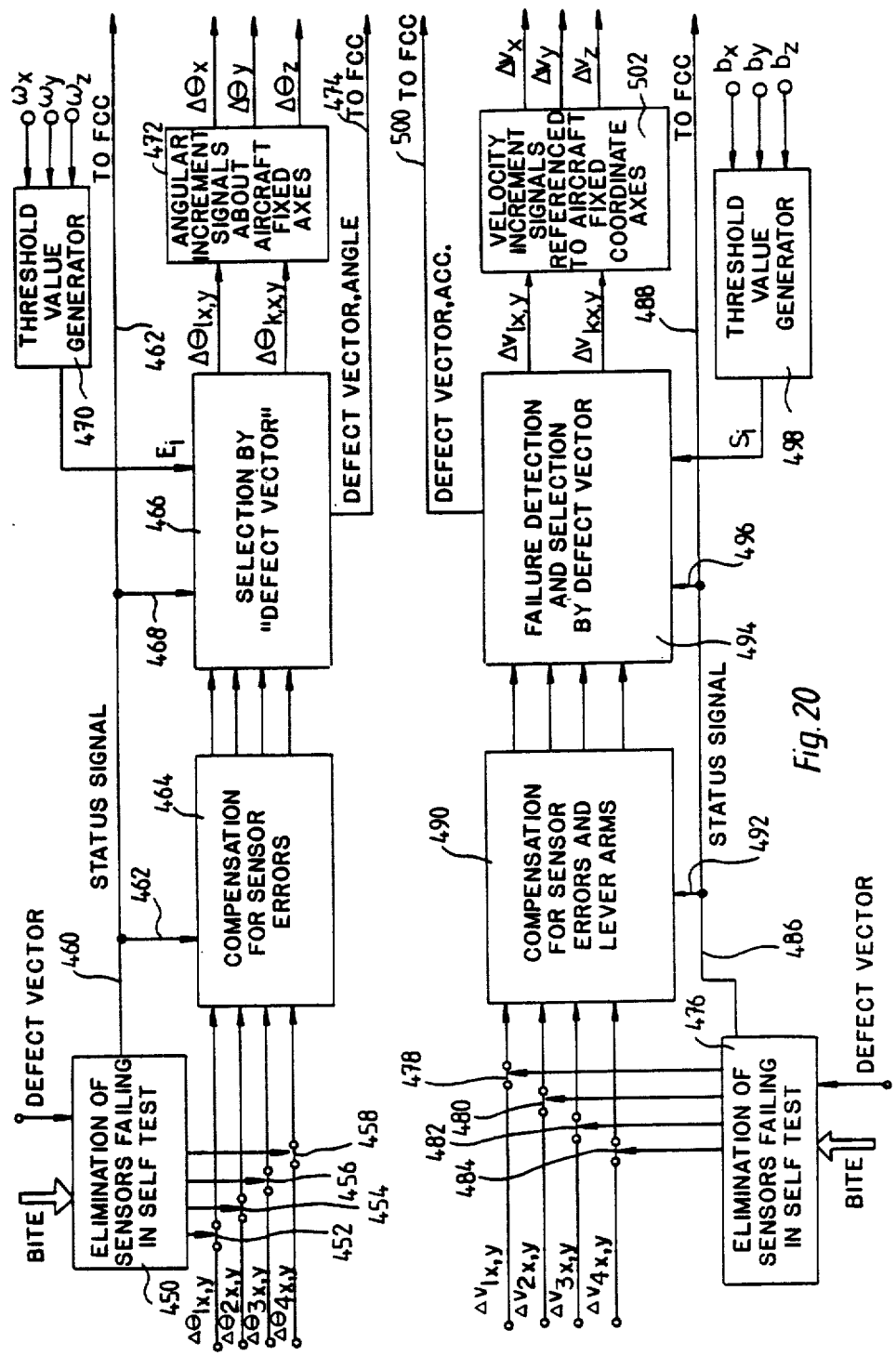
FIG. 20 is a block diagram and illustrates the selection of the signals for the headingattitude reference for the further processing.

FIG. 20 is a block diagram and illustrates the selection of the signals for the heading-attitude reference.

The angular rate sensors 248 to 254 supply angular increment signals $\Delta\Theta_{1x,y}, \Delta\Theta_{2x,y}, \Delta\Theta_{3x,y}$ and $\Delta\Theta_{4x,y}$. The angular rate sensors 248 to 254 are again subjected to a self-test, as indicated by block 450. Therein data from the self-test of, for example, the current supply are processed by the Built In Test Equipment (BITE), as well as the defect vector, which occured in the selection of the angular rate measuring values for the flight control (FIG. 16). Correspondingly measuring values from defective angular rate sensors 248 to 254 are eliminated. This is again symbolized by switches 452,454,456,458.

The circuit 450 supplies a status signal at an output 460. This signal is applied to the flight control computer through a line 462. The status signal is also applied to an input 462 of a circuit 464. The sensor errors of the non-eliminated angular increment signals are compensated for in the circuit 464 to the accuracy necessary for the heading-attitude reference. The angular increment signals compensated for in this way are then subjected to a selection in a circuit 466 by means of the formation of a defect vector illustrated in FIG. 17. Therein the defect vector is formed for the added up angular increments. The circuit 466 receives the status signal at an input 468 and threshold values $E_i$ from a threshold value generator 470. The angular rates $\omega_x, \omega_y$ and $\omega_z$ are applied to the threshold value generator 470.

The circuit 466 selects the angular increment signals $\Delta\Theta_{1x,y}$ and $\Delta\Theta_{kx,y}$ from two of the units 212 to 218. These signals are applied to a circuit 472, which forms three angular increment signals $\Delta\Theta_x, \Delta\Theta_y$ and $\Delta\Theta_z$, which illustrate rotations about the aircraft-fixed coordinate axes.

The defect vector for the angle is output by the circuit 466 at an output 474.

The channel for the signals of the acceleration sensors is structured in a similar way.

The acceleration sensors supply velocity increment signals $\Delta v_{1x,y}, \Delta v_{2x,y}, \Delta v_{3x,y}$ and $\Delta v_{4x,y}$. These velocity increment signals are subjected to a self-test by a circuit 476 in consideration of self-test information (BIT) and of the defect vector obtained for the acceleration measuring values for the flight control. Acceleration measuring values from defective units 212 to 218 are eliminated. This is symbolized by switches 478, 480, 482, 484. The circuit 476 supplies a status signal at an output 486, which signal is applied to the flight control computer through a line 488.

The non-eliminated acceleration measuring values are applied to a circuit 490. This circuit effects the compensation of remaining sensor errors to the accuracy necessary for the heading-attitude reference as well as a compensation of the lever arms. The circuit 490 also receives the status signal from the circuit 476 at an input 492. The acceleration measuring values thus compensated for are applied to a circuit 494. This circuit effects again a failure detection and elimination by forming a defect vector, as already described in connection with FIG. 17. The defect vector is formed on the basis of the added up velocity increments. The circuit 494 also receives the status signal from the circuit 476 at an input 496. Furthermore, the circuit receives threshold values $S_i$ from a threshold value generator 498. The acceleration signals $b_x, b_y$ and $b_z$ are applied to the threshold value generator. The circuit 494 outputs the defect vector of this acceleration measurement at an output 500.

The circuit 494 selects two of the units 212 to 218, the velocity increment signals $\Delta v_{1x,y}$ and $\Delta v_{kx,y}$ are further processed. These signals are applied to a circuit 502, which therefrom forms measuring values of the velocity increments $\Delta v_x, \Delta v_y$ and $\Delta v_z$ referenced to the three aircraft-fixed coordinate axes.

Figure 21:
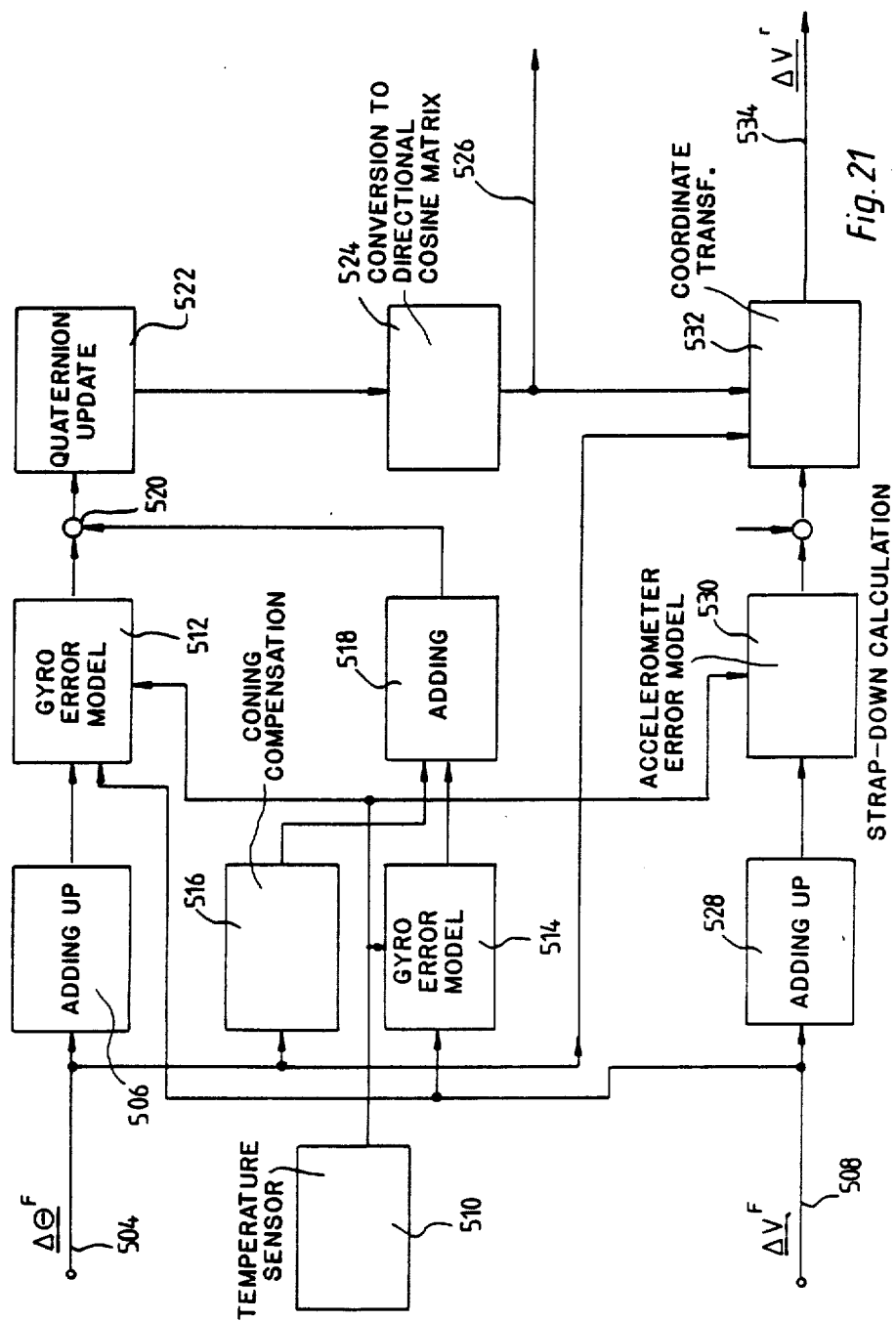
FIG. 21 is a block diagram and illustrates the "strap down" calculations.

The angular and velocity increment signals obtained from the circuit according to FIG. 20 serve for the strap down calculation according to FIG. 21.

The angular increment measuring values at an input 504 corresponding to the output of FIG. 20 are added up, as illustrated by block 506. The added up angular increment signals are applied to a first gyro error model 512 together with the velocity increment signals from an input 508 and a temperature signal from a temperature sensor 510. The gyro error model 512 supplies corrected angular increment signals. The velocity increment signals from the input 508 are furthermore applied to a second gyro error model 514, which takes the anisoelasticity of the gyros into account. Furthermore, the angular increment signals from the input 504 are used for a "coning" compensation of first order, as illustrated by block 516. The second gyro error model 514 as well as the block 516 supply incremental correcting signals, which are added up according to block 518 and effect correction of the angular increment signals from the first gyro error model 512 in a summing point 520. These corrected angular increment signals serve for updating a quaternion, which is illustrated by block 522. As illustrated by block 524, the quaternion is converted into the direction cosine matrix. The elements of the direction cosine matrix are output at an output 526.

The velocity increment signals at the input 508 are measured in the aircraft-fixed coordinate system. As illustrated by block 528, they are added up and supplied to an error model 530 for the accelerometers. The error model 530 also receives the temperature signal from the temperature sensor 510. The velocity increment sigals corrected according to the error model are then subjected to coordinate transformation illustrated by block 532. This coordinate transformation is effected with the direction cosine matrix of block 524 and according to the angular increment signals at the input 504. In this way a vector of velocity increment signals, which is referenced to an earth-fixed coordinate system is generated at an output 534.

Figure 22:
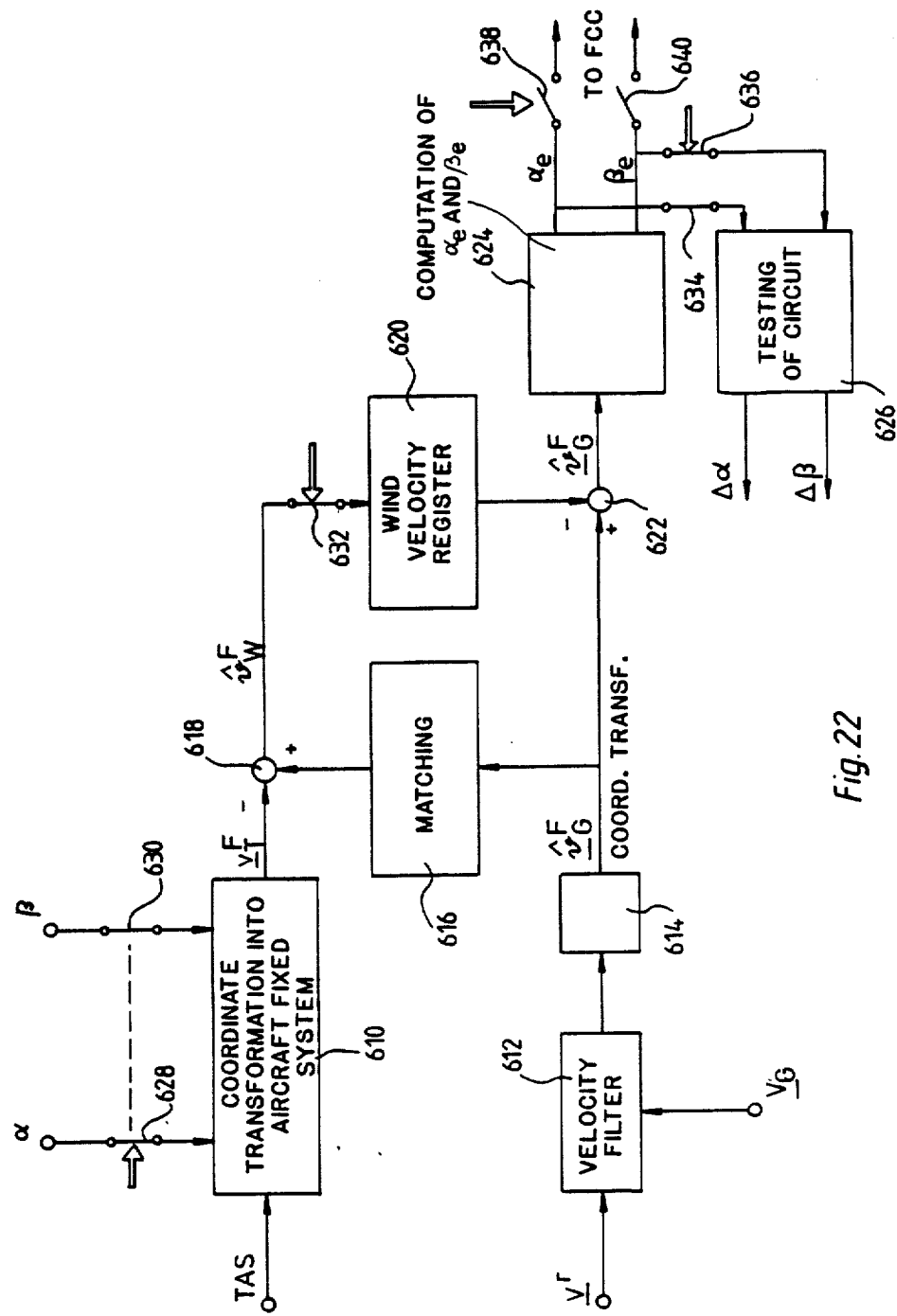
FIG. 22 is a block diagram and shows the determination of angle of attack and angle of side-slip.

FIG. 22 is a block diagram and shows a way for determination of angle of attack and angle of side-slip from data of the inertial navigation system for the case of emergency when the aerodynamic sensors for these angles fail.

Reference systems of the present type having redundant signal generation and processing are preferably used in aircrafts having small inherent stability, for which the functioning of the flight control is vital. For such aircrafts two further quantities are very decisive, namely the angle of attack and the angle of side-slip. Angle of attack and angle of side-slip are usually measured directly by aerodynamic sensors. Because of the importance of these quantities the sensors are also redundant. This redundance is, however, subjected to limits, because the sensors can be mounted only at particular locations of the aircraft. Thus, as a rule, a maximum of three such aerodynamical sensors are provided for angle of attack and angle of side-slip. Therewith, however, it is not possible to achieve the required degree of security "fail-operational, fail-operational, fail-safe". The arrangement according to FIG. 22 permits, in case of failure of the aerodynamic sensors, to make the measuring values of angle of attack and angle of side-slip from the inertial navigation system available at least for a limited time, which may be sufficient for a landing.

In the normal case the "true airspeed" TAS, that is the velocity of the aircraft relative to the surrounding air, is transformed on the basis of the available values of angle of attack and angle of side-slip $\beta$ into the aircraft-fixed coordinate system, as illustrated by block 610. A velocity vector $\underline{v}_T^F$ results. From the inertial navigation system a velocity over ground is obtained, which is illustrated by a vector $\underline{v}_G$. A further velocity measuring value $v^r$ is obtained from the described reference device. From this an optimal estimated value of the velocity of the aircraft over ground in the earth-fixed coordinate system is formed through a velocity filter 612. This estimated value is transformed by means of the direction cosine matrix supplied by the present reference device and illustrated by block 614 into an estimated value $v_G^F$ of the velocity over ground measured in the aircraft-fixed coordinate system. After matching illustrated by block 616, the two velocities referenced to the same aircraft-fixed coordinate system can be subtracted from each other, as illustrated by the summing point. Then the wind velocity measured in the aircraft-fixed coordinate system results.

This wind velocity is memorized in a register 620.

An estimated value for the true airspeed can now be obtained again in a summing point 622 from the wind velocity and the estimated value of the velocity over ground. Estimated values $\alpha_e$ and $\beta_e$ for the angle of attack and the angle of side-slip can be calculated from this estimated value $v_T^F$. This is illustrated by block 624.

In normal operation these estimated values are used for the testing of the described circuit after time and phase matching and comparison, illustrated by block 626. This ensures, that always the actual vector of the velocity is memorized in the register 620.

If now the aerodynamic sensors do not any more or not in a well defined manner supply the angle of attack and the angle of side-slip, which will be signalled by the flight control computer, then change-over is effected, which is illustrated by various switches in FIG. 22. When the angle of attack and angle of side-slip sensors fail, all switches are changed to the switch position opposite the illustrated one: Switches 628 and 630 open. Thereby the measuring values of the angle of attack and of the angle of side-slip subjected to error are not applied any more. Switch 632 opens. Thus, false values of the wind velocities are not memorized in the register 620. The register 620 memorizes, further on, the last "correct" value. The switches 634 and 636 open. Testing with the aerodynamically measured values does not take place. Switches 638,640 close. The estimated values $\alpha_e$ and $\beta_e$ of the angle of attack and angle of side-slip are applied to the flight control computer.

The flight control computer now receives the estimated values of angle of attack and angle of side-slip under the assumption, that the wind keeps its prevailing power and direction and corresponds to the memorized value of the wind velocity. These estimated values are generally usable for a while and can make a landing possible.

Figure 23:
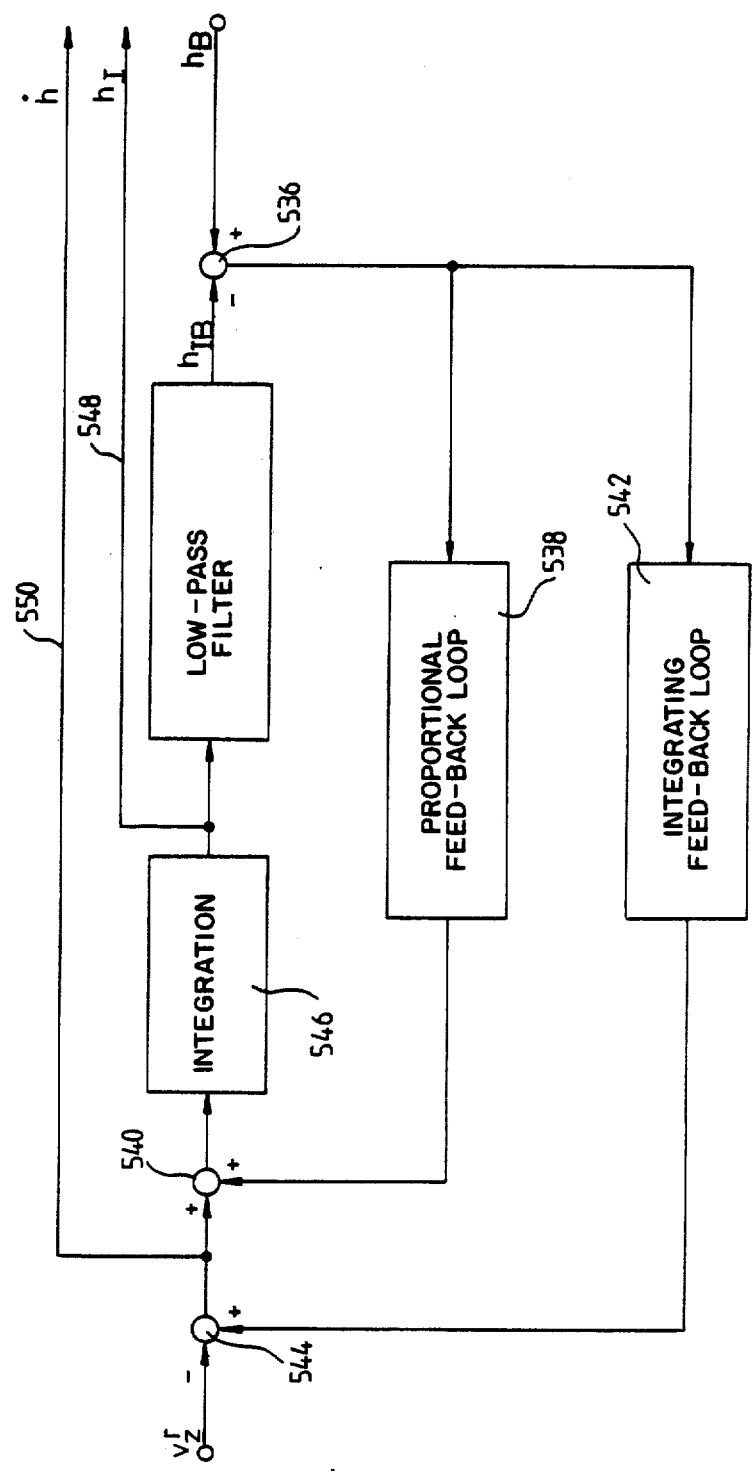
FIG. 23 is a block diagram and shows the mechanization of a vertical channel for generating signals, which represent the altitude and the altitude variation.

FIG. 23 shows the vertical channel 160 of FIG. 9.

The vertical channel receives, on one hand, the vertical velocity in the earth-fixed coordinate system $v_z^r$ from the coordinate transformation circuit 156 in FIG. 9 and 532 in FIG. 21, respectively. On the other hand, the vertical channel receives the pressure altitude $h_B$. A quantity $h_{IB}$ is compared to the pressure altitude $h_B$ at a summing point 536. The difference is, on one hand, transferred to a summing point 540 in a proportional feed back loop 538 and, on the other hand, transferred to a summing point 544 through an integrating feed back loop 542. In the summing point 544 the vertical velocity is compared to the integrated difference. The difference from the summing point 544 is superimposed to the signal in the proportional feed back circuit 538 in the summing point 540. The sum from the summing point 540 is integrated by integrating means 546. The integral supplies said signal $h_{IB}$ through a low-pass filter of first order.

The structure represents a kind of "control loop", in which the quantity $h_{IB}$ representing a damped altitude signal is controlled to the value of the pressure altitude and the difference at the summing point 536 disappears. Then the integrating feed-back supplies a constant correction of the velocity. The proportional feed back is zero. The integration by the integrating means 546 supplies the altitude $h_I$, whereas the altitude variation h appears at the summing point 544, that is the vertical velocity aided by the pressure altitude. Altitude h and altitude variation h are output at outputs 548 and 550.

Figure 24:
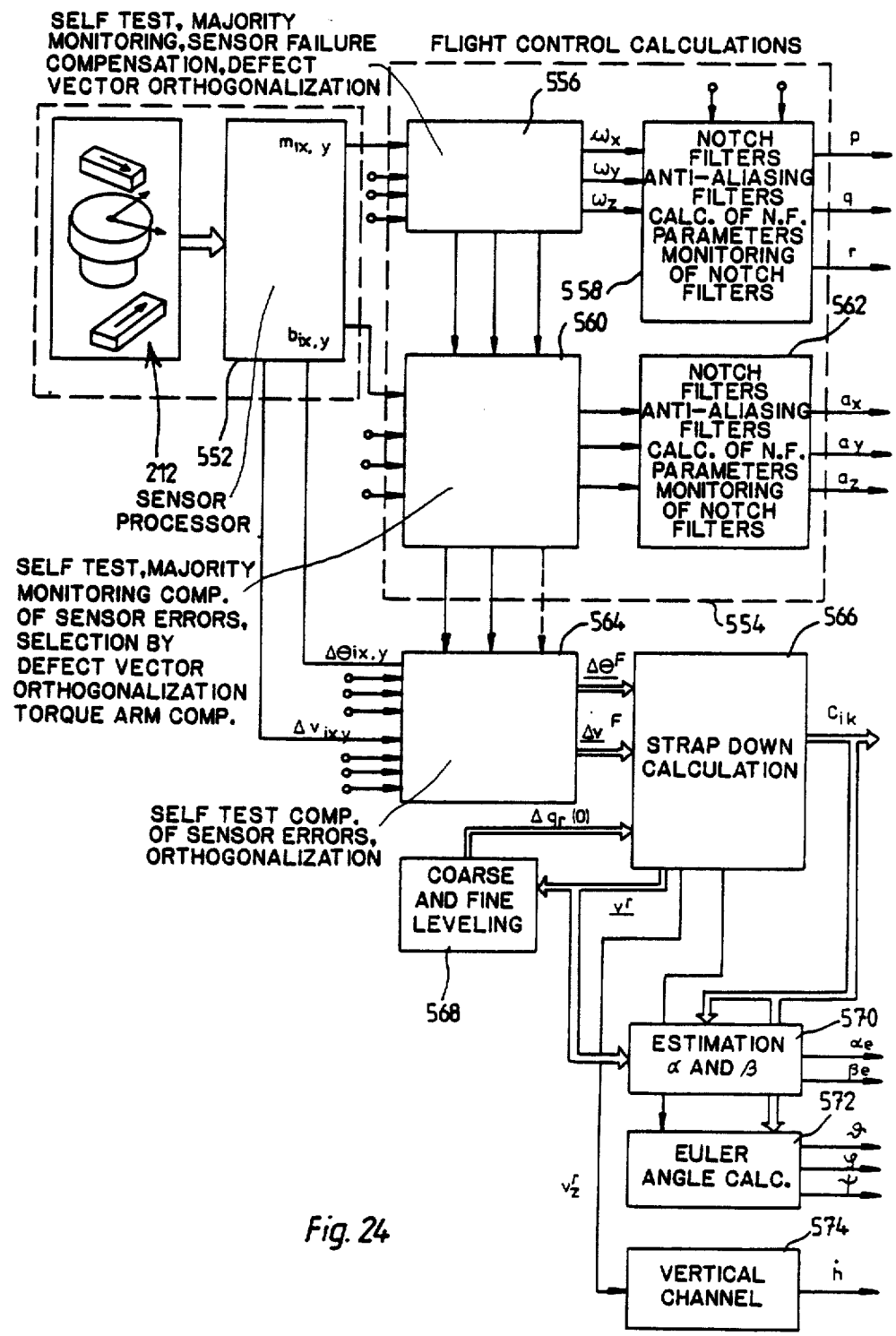
FIG. 24 shows the software structure of the computer of the inertial navigation arrangement.

FIG. 24 shows the software structure of the computer of the inertial navigation arrangement.

Numeral 212 indicates a unit having a two-axis angular rate sensor 248 and two acceleration sensors 256,258, which is illustrated vicariously for the described arrangement of four such units and supplies angular rate and acceleration signals. The sensor signals are applied to a sensor processor 552. The sensor processor 552 effects the restraining and the compensation of sensor errors, as far as they can be compensated for in the sensor itself. The sensor processor 552 supplies the digitized signals $m_{ix,y}$ and $b_{ix,y}$. The calculations for the flight control is illustrated in the broken line square 554. Block 556 symbolizes the self-test, the majority monitoring, the sensor failure compensation, the selection by forming a defect vector and the orthogonalization of the angular rate signals, as illustrated in FIG. 16. Therefrom the signals $\omega_x, \omega_y$ and $\omega_z$ result. These signals are applied to block 558. This block illustrates the notch filters, the anti-aliasing filters, the calculation of the notch filter parameters and the monitoring of the notch filters, as illustrated in detail in FIG. 18 Block 558 supplies the angular rates p,q and r about the aircraft-fixed axes for the flight control.

The acceleration signals $b_{ix,y}$ are applied to a block 560. Block 560 also receives the angular rates from block 556. Block 560 illustrates the self-test of the acceleration sensors, the majority monitoring, the compensation of sensor errors including the lever arm compensation, the selection by forming a defect vector, the orthogonalization and the moment arm compensation. That are the functions, which are illustrated in detail in FIG. 19. Also the velocity values thus obtained are applied to a block 562, which represents notch filters, anti-aliasing filters, the calculation of the notch filter parameters and the monitoring of the notch filters. This is similar as in FIG. 18 and therefore not once again illustrated in detail here. Acceleration values $a_x$, $a_y$ and $a_z$ result again for the flight control.

Angular increment signals $\Delta\Theta_{ix,y}$ and velocity increment signals $\Delta v_{ix,y}$ are supplied by the sensor processor 552 for each unit 212 to 218. These signals are applied to block 564. Block 564 represents a self-test, a compensation of the sensor errors to the accuracy necessary for the heading-attitude reference and an orthogonalization. A selection of the measuring values according to the defect vectors is effected by block 560. This is illustrated in detail in FIG. 20.

The thus obtained angular increment signals comprised in vectors $\Delta\Theta^F$ and $\Delta v^F$ are applied to block 566, which illustrates the "strap down" calculation according to FIG. 21. Block 566 receives furthermore an initial value of the quaternion of block 568, which illustrates the initialization with coarse and fine levelling and which is illustrated in detail in FIGS. 12 and 13. Block 566 supplies the direction cosine matrix and the velocity $\underline{v}^r$.

This velocity $\underline{v}^r$ is applied to block 568 and to a block 570, which represents an estimation of the angle of attack and the angle of side-slip, which is effective, when angkle of attack and angle of side-slip sensors of the aircraft fail. The block 570 also receives the direction cosine matrix from block 566. Block 570 is illustrated in detail in FIG. 22.

Finally the Euler angles are calculated from the direction cosine matrix according to block 572.

The vertical component $v_z^r$ of the velocity measured in the earth-fixed coordinate system is applied to a block 574, which corresponds to block 160 in the illustration of FIG. 9 and which is illustrated in detail in FIG. 23. That is a vertical channel, which supplies the altitude variation aided by the pressure altitude.

We claim:

1. An integrated, redundant reference system providing angular rate and heading and attitude information for the flight control of aircraft by means of an autopilot, comprising
    (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes,
    (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis,
    (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros,
    (d) first signal processing means to which said set of selected angular rate signals is applied for providing a set of corrected angular rate signals referenced to a vehicle-fixed coordinate system, said corrected angular rate signals being applied to said autopilot for stabilizing said aircraft, and
    (e) second signal processing means to which said corrected angular rate signals are applied for providing heading and attitude reference signals.

2. Reference system as set forth in claim 1, wherein the axis of the cone extends parallel to a pitch axis (y) of the aircraft which is horizontal and perpendicular to the longitudinal axis of the aircraft.

3. Reference system as set forth in claim 1, wherein the means for failure detection of the sensors comprise
    (a) linear combination and comparison means for
        forming, for each of said passed signals, a comparison value by linear combination of signals from other ones of said gyros,
        forming the differences of said signals and said comparison values and
        comparing said differences with second threshold values, and
    (b) locating means for determining a deficient sensor, if a signal is deficient, from the subset of the sensors, for which said linear combination and comparison means indicate exceeding of said threshold value, signals from said deficient sensor being excluded from further signal processing.

4. Reference system as set forth in claim 1, wherein the input axes of the four dynamically tuned gyros are orientated in pairs symmetrically with reference to the axis of the cone.

5. An integrated, redundant reference system providing angular rate and heading and attitude information for the flight control of aircraft by means of an autopilot, comprising
    (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes,
    (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis,
    (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros,
    (d) first signal processing means to which said set of selected angular rate signals is applied for providing a set of corrected angular rate signals reference to a vehicle-fixed coordinate system, said corrected angular rate signals being applied to said autopilot for stabilizing said aircraft,
    (e) second signal processing means to which said corrected angular rate signals are applied for providing heading and attitude reference signals, and
    (f) strap-down acceleration sensor means for providing a plurality of acceleration signals
        (1) said acceleration sensor means comprise means for sensing acceleration along more than three input axes, said input axes being oriented to provide redundant acceleration information,
        (2) plurality of said acceleration signals from said acceleration sensor means providing redundant acceleration information being applied to acceleration failure detecting and eliminating means eliminating deficient accelerating signals and for selecting from said plurality of acceleration signals, in normal operation, a selected set of acceleration signals from operative acceleration sensors,
        (3) said selected set of acceleration signals being applied to said first signal processing means for providing a set of corrected acceleration signals referenced to said vehicle fixed coordinate system, also said corrected acceleration signals being applied to said autopilot for stabilizing said aircraft, and (4) said acceleration sensor means comprising a respective pair of accelerometers associated with each two-axis gyro, the input axes of which accelerometers are parallel to one of the input axes of the gyro.

6. Reference system as set forth in claim 5, wherein
(a) a separate power supply unit, a separate motor power supply, and a separate signal processing unit to which the measuring signals of the angular rate sensors are applied, are provided for each of the gyros,
(b) acceleration signals from at least one associated acceleration sensor means are additionally applied to each signal processing unit,
(c) the acceleration sensor means are also supplied by power supply units of the gyros, and
(d) each signal processing unit supplies two angular rate signals and at least one acceleration signal.

7. Reference system as set forth in claim 6, wherein
(a) each gyro comprises
   a first and a second position pick-off, which are supplied with alternating current from the motor power supply, and
   a first and a second torquer,
(b) demodulators arranged to demodulate the alternating current pick-off signals generated by the first and second position pick-offs to form demodulated pick-off signals,
(c) a multiplexer arranged to apply the demodulated pick-off signals to an analog-to-digital converter to form digitized pick-off signals,
(d) the digitized pick-off signals are applied to a digital signal processing circuit, which supplies digital restraining signals for the gyro,
(e) the digital restraining signals are adapted to be applied to a digital-to-analog converter for generating analog restraining signals,
(f) analog value storing means for the analog restraining signals are connected to the digital-to-analog converter, and
(g) the analog value storing means are connected to the torquers of the gyro.

8. Reference system as set forth in claim 5, wherein
(a) the axis of the notional cone extends parallel to the longitudinal axis of the aircraft, the surface of which cone determines the input axes of the angular rate sensors,
(b) said acceleration sensor means comprise five acceleration sensors,
(c) the input axes of the acceleration sensors extend parallel to different generatrices of the surface of an imaginary second cone, and
(d) the axis of the notional second cone extends parallel to a vertical craft axis of the aircraft which is vertical and perpendicular to the longitudinal axis of the aircraft.

9. Reference system as set forth in claim 8, wherein
(a) the gyros are arranged in a sensor block semicircularly in space about the longitudinal axis of the vehicle and
(b) the acceleration sensors are arranged in the sensor block substantially within this semicircular arrangement of the gyros.

10. Reference system as set forth in claim 8, wherein
(a) the cone angle of the notional second cone is 54.73°, and
(b) the input axes of the five acceleration sensors are determined by six generatrices equally distributed about the axis of the cone in that each of these input axes extends parallel to one of five of these six generatrices.

11. An integrated, redundant reference system providing angular rate and heading and attitude information for the fight control of aircraft by means of an autopilot, comprising
(a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes,
(b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis,
(c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros,
(d) first signal processing means to which said set of selected angular rate signals is applied for providing a set of corrected angular rate signals reference to a vehicle-fixed coordinate system, said corrected angular rate signals being applied to said autopilot for stabilizing said aircraft,
(e) second signal processing means to which said corrected angular rate signals are applied for providing heading and attitude reference signals,
(f) strap-down acceleration sensor means for providing a plurality of acceleration signals being also applied to said first signal processing means for providing a set of corrected acceleration signals referenced to said vehicle fixed coordinate system, also said corrected acceleration signals being applied to said autopilot for stabilizing said aircraft,
(g) first means for the transformation of the true airspeed, which is the aerodynamically measured aircraft velocity relative to the surrounding air, into the aircraft-fixed coordinate system, on the basis of the angle of attack and angle of side-slip likewise measured by aerodynamical sensors,
(h) second means for determination of the aircraft velocity over ground in an aircraft-fixed coordinate system,
(i) difference forming means for determination of the wind velocity in the aircraft-fixed coordinate system as difference between the aircraft velocity relative to the surrounding air determined by the first means and the aircraft velocity over ground determined by the second means,
(j) memory means for memorizing the thus determined wind velocity,
(k) third means for forming estimated values of the angle of attack and the angle of side-slip from the wind velocity memorized in the memory means and the aircraft velocity over ground supplied from the second means, and (l) conversion means, which, in case of failure of the aerodynamical sensors for angle of attack and angle of side-slip, is adapted to separate the memory means from the difference forming means and apply the estimated values of angle of attack and angle of side-slip formed by the third means, instead of the sensor signals, to the autopilot computer.

12. An integrated, redundant reference system providing angular rate and heading and attitude information for the flight control of aircraft by means of an autopilot, comprising (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes, (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis, (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros, (d) first signal processing means to which said set of selected angular rate signals is applied for providing a set of corrected angular rate signals reference to a vehicle-fixed coordinate system, said corrected angular rate signals being applied to said autopilot for stabilizing said aircraft, and (e) second signal processing means to which said corrected angular rate signals are applied for providing heading and attitude reference signals, wherein (f) a first set of gyros is used for measuring the three components of the angular rate while they are operating properly, and (g) when a failure appears a change-over is caused to a second set of gyros from a sequence of alternative sets with different combinations of gyros, none of which have failed.

13. The integrated, redundant reference system as claimed in claim 12, wherein said deficiency detecting and eliminating means comprise:

(a) voter means to which reference axis angular rate signals are applied, each of these applied reference axis angular rate signals being indicative of angular rate about said reference axis and proportional to the sum of the angular rates sensed about the input axes of one of said dynamically tuned gyros, said voter means being arranged to form a reference value for each of said reference axis angular rate signals from all the other reference axis angular rate signals and to determine reference axis angular rate signals which exceed a first threshold value, the associated gyros being regarded as inoperative, (b) means for eliminating signals from such inoperative gyros and for passing signals from operative gyros, (c) sensor error compensation means for compensating sensor errors of said passed signals to an accuracy required for providing the attitude and heading information for the flight control, (d) linear combination and comparison means for forming, for each of said passed signals, a comparison value by linear combination of signals from other ones of said gyros, forming the differences of said signals and said comparison values and comparing said differences with second threshold values, and (e) locating means for determining a deficient sensor, if a signal is deficient, from the subset of the sensors, for which said linear combination and comparison means indicate exceeding of said threshold value, signals from said deficient sensor being excluded from further signal processing.

14. Reference system as set forth in claim 13, wherein self-test of the gyros is connected to the input of the means for failure detection according to the principle of majority monitoring.

15. Reference system as set forth in claim 13 wherein the threshold values are automatically variable as a function of the measuring values.

16. The integrated, redundant reference system as claimed in claim 1 and further comprising (f) strap-down acceleration sensor means for providing a plurality of acceleration signals being also applied to said first signal processing means for providing a set of corrected acceleration signals referenced to said vehicle fixed coordinate system, also said corrected acceleration signals being applied to said autopilot for stabilizing said aircraft.

17. Reference system as set forth in claim 16, wherein the first signal processing means comprise (a) coordinate transformation means for transformation of the signals obtained from the means for failure detection and elimination into transformed angular rate signals, which are referred to a vehicle-fixed coordinate system, and transformed acceleration signals, which are referred to a vehicle-fixed coordinate system, respectively, and (b) means for calculation and output of output signals for the autopilot, to which means these angular rate and acceleration signals are applied.

18. Reference system as set forth in claim 16, characterized in that the first signal processing means (120) have first integrating means (140) for integrating the transformed angular rate signals and second integrating means (142) for integrating the transformed acceleration signals.

19. Refence system as set forth in claim 16, wherein (a) the first signal processing means supply transformation parameters for the transformation of vectors from an aircraft-fixed coordinate system into an earth-fixed coordinate system to attitude outputs, which transformation parameters result from integration of angular rate information, (b) the second signal processing means comprise initial aligning means for determination of initial values of the transformation parameters, means for determination of correcting values for taking earth rotation and transport rate into consideration, correcting means for correction of the transformation parameters with respect to initial values, earth rotation and transport rate, and means for calculation and output of the heading and attitude angles from the thus corrected transformation parameters.

20. Reference system as set forth in claim 19, wherein (a) the first signal processing means supply velocity values to velocity outputs which velocity values result from integration of acceleration informations in a vehicle-fixed coordinate system, (b) the second signal processing means comprise a coordinate transformation circuit,
which operates with the corrected transformation parameters from said correcting means and
which is arranged to transform said velocity values into an earth-fixed coordinate system, (c) the velocity components measured with the vehicle at rest by integration of acceleration components are applied to the initial aligning means, which velocity components form a measure of the initial inclination of the vehicle.

21. The integrated, redundant reference system as claimed in claim 16 additionally including acceleration failure detecting and eliminating means, wherein (a) said acceleration sensor means comprise means for sensing acceleration along more than three input axes, said input axes being oriented to provide redundant acceleration information, (b) all of said acceleration signals from said acceleration sensor means providing redundant acceleration information being applied to acceleration failure detecting and eliminating means eliminating deficient accelerating signals and for selecting from said applied acceleration signals, in normal operation, a set of acceleration signals from operative acceleration sensors, and (c) said selected set of acceleration signals from operative acceleration sensors being applied to said first and second signal processing means.

22. An integrated, redundant reference system providing angular rate and heading and attitude information for the flight control of aircraft by means of an autopilot, comprising (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes, (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis, (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros, (d) first signal processing means to which said set of selected angular rate signals is applied for providing a set of corrected angular rate signals reference to a vehicle-fixed coordinate system, said corrected angular rate signals being applied to said autopilot for stabilizing said aircraft, (e) second signal processing means to which said corrected angular rate signals are applied for providing heading and attitude reference signals, (f) strap-down acceleration sensor means for providing a plurality of acceleration signals being also applied to said first signal processing means for providing a set of corrected acceleration signals referenced to said vehicle fixed coordinate system, also said corrected acceleration signals being applied to said autopilot for stabilizing said aircraft, wherein (g) the first signal processing means supply
transformation parameters for the transformation of vectors from an aircraft-fixed coordinate system into an earth-fixed coordinate system to attitude outputs, which transformation parameters result from integration of angular rate information,
velocity values to velocity outputs, which velocity values result from integration of acceleration information in a vehicle-fixed coordinate system, (h) the second signal processing means comprise
initial aligning means for determination of initial values of the transformation parameters,
means for determination of correcting values for taking earth rotation and transport rate into consideration,
correcting means for correction of the transformation parameters with respect to initial values, earth rotation and transport rate, and
means for calculation and output of the heading and attitude angles from the thus corrected transformation parameters,
a coordinate transformation circuit which operates with the corrected transformation parameters from said correcting means, and which is arranged to transform said velocity values into an earth-fixed coordinate system, and (i) the velocity components measured with the vehicle at rest by integration of acceleration componenets are applied to the initial aligning means, which velocity components form a measure of the initial inclination of the vehicle, and velocity computer means
to which the velocity values transformed by the coordinate transformation circuit and
flying speed as well as angle of attack and angle of side-slip are supplied, and
which apply velocity components to the means for determination of correcting values for taking the earth rotation and transport rate into consideration, and
which apply velocity components to a vertical channel aided by the pressure altitude, which vertical channel supplies flight altitude and vertical velocity.

23. An integrated, redundant reference system providing angular rate and heading and attitude information for the flight control of aircraft by means of an autopilot, comprising (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes, (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis, (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros, (d) first signal processing means to which said set of selected angular rate signals is applied for providing a set of corrected angular rate signals reference to a vehicle-fixed coordinate system, said corrected angular rate signals being applied to said autopilot for stabilizing said aircraft, (e) second signal processing means to which said corrected angular rate signals are applied for providing heading and attitude reference signals, (f) strap-down acceleration sensor means for providing a plurality of acceleration signals being also applied to said first signal processing means for providing a set of corrected acceleration signals referenced to said vehicle fixed coordinate system, also said corrected acceleration signals being applied to said autopilot for stabilizing said aircraft, wherein (g) the first signal processing meaNs supply
transformation parameters for the tranrformation of vectors from an aircraft-fixed coordinate system into an earth-fixed coordinate system to attitude outputs, which transformation parametars result from integration of angular rate information, velocity vlues to velocity outputs, which velocity values result from integration of acceleration information In a vehicle-fixed coordinate system, (h) the second signal processing means comprise
initial aligning means for determination of initial values of the transformation parameters, means for determination of correcting values for taking earth rotation and transport rate into consideration, correcting means for correction of the transformation parameters with respect to initial values, earth rotation and transport rate, and means for calculation and output of the heading and attitude angles from the thus corrected transformation parameters, coordinate transformation circuit which operates with the corrected transformation parameters from said correcting means, which is arranged to transform said velocity values into an earth-fixed coordinate system, and (i) the velocity components measured with the vehicle at rest by integration of acceleration components are applied to the initial aligning means, which velocity components form a measure of the initial inclination of the vehicle, furthermore an external initial heading information is applied to the initial aligning means.

24. An integrated, redundant reference system providing angular rate and heading and attitude information for the flight control of aircraft by means of an autopilot, comprising (a) at least four strap-down, dynamically tuned gyros, each of said gyros having a spin axis and two mutually orthogonal input axes normal to said spin axis, the directions of said axes being defined by respective direction vectors, each of said dynamically tuned gyros providing two angular rate signals indicative of angular rates about said two input axes, (b) said gyros being oriented with the direction vectors of their spin axes extending radially with respect to a common reference axis, the direction vectors of said input axes of all gyros being different and located on a notional cone having a cone angle of 90°, the axis of said cone coinciding with said reference axis, (c) means equally operatively connected to all gyros for detecting deficiencies of said gyros and for eliminating signals from deficient gyros, the angular rate signals from all said gyros being supplied to said deficiency detecting and eliminating means, said deficiency detecting and eliminating means, in normal operation, providing a set of selected angular rate signals from operative gyros, (d) first signal processing means to which said set of selected angular rate signals is applied for providing a set of corrected angular rate signals reference to a vehicle-fixed coordinate system, said corrected angular rate signals being applied to said autopilot for stabilizing said aircraft, (e) second signal processing means to which said corrected angular rate signals are applied for providing heading and attitude reference signals, (f) strap-down acceleration sensor means for providing a plurality of acceleration signals being also applied to said first signal processing means for providing a set of corrected acceleration signals referenced to said vehicle fixed coordinate system, also said corrected acceleration signals being applied to said autopilot for stabilizing said aircraft, wherein (g) the first signal processing means supply
transformation parameters for the transformation of vectors from an aircraft-fixed coordinate system into an earth-fixed coordinate system to attitude outputs, which transformation parameters result from integration of angular rate information, velocity values to velocity outputs, which velocity values result from integration of acceleration information in a vehicle-fixed coordinate system, (h) the second signal processing means comprise
initial aligning means for determination of initial values of the transformation parameters, means for determination of correcting values for taking earth rotation and transport rate into consideration, correcting means for correction of the transformation parameters with respect to initial values, earth rotation and transport rate, means for calculation and output of the heading and attitude angles from the thus corrected transformation parameters, and a coordinate transformation circuit which operates with the corrected transformation parameters from said correcting means, and which is arranged to transform said velocity values into an earth-fixed coordinate system, and (i) the velocity components measured with the vehicle at rest by integration of acceleration components are applied to the initial aligning means, which velocity components form a measure of the initial inclination of the vehicle, wherein the initial aligning means comprise (1) fast responding coarse leveling means, to which velocity increment signals from the acceleration sensor means are applied and which supply an initial direction cosine matrix for transformation from an aircraft-fixed system into an earth-fixed system, (2) means for updating the direction cosine matrix, to which angular increment signals from the angular rate sensor means are applied, (3) velocity transformation means, to which the velocity increment signals are applied and which supply a velocity vector transformed with the direction cosine matrix in an earth-fixed coordinate system, (4) fine leveling means, to which the transformed velocity vector and the geographical latitude are applied, and which apply attitude correction signals to the means for updating the direction cosine matrix and which supply signals, which are determined by the influence of the earth rotation on the angular rate sensors, and (5) means for determining the heading from said signals determined by the earth rotation.

25. Reference system as set forth in claim 24, wherein (a) for initial fine alignment of the system the angular increment signals from the gyros are converted into a quaternion through conversion means, said quaternion starting from an initial value and being updated by said angular increment signals (b) conversion means for conversion of the quaternion into the direction cosine matrix, by means of which a transformation of the velocity increment signals from the acceleration sensor means is effected from a system-fixed coordinate system into an earth-fixed coordinate system, (c) the thus transformed velocity increment signals are applied to a Kalman filter, which simulates the influence of the earth rotation on the gyros and generates actuating signals depending on the earth rotation for the heading and attitude correction, when the coordinate system defined by the direction cosine matrix differs from the earth-fixed coordinate system, and (d) the actuating signals effect a correction of the quaterion through conversion means.

* * * * *